United States Patent
Khattab et al.

[11] Patent Number: 5,259,879
[45] Date of Patent: Nov. 9, 1993

[54] POWDER APPLICATION BOOTH LINER AND METHOD OF MAKING IT

[75] Inventors: Ghazi M. A. Khattab, Glenview; Jeffrey M. Stupar, West Dundee; James W. Stone, Northbrook, all of Ill.; Christopher R. Merritt, Noblesville, Ind.; Philip B. Lo Presti, Chicago; Michael J. McMahon, Palatine, both of Ill.

[73] Assignee: Ransburg Corporation, Indianapolis, Ind.

[21] Appl. No.: 890,610

[22] Filed: Jun. 5, 1992

Related U.S. Application Data

[63] Continuation-in-part of Ser. No. 722,092, Jun. 27, 1991, abandoned.

[51] Int. Cl.⁵ .............................................. B05B 15/12
[52] U.S. Cl. .................................. 118/309; 118/326; 118/634; 52/2.24
[58] Field of Search ................. 52/2.11, 2.15, 2.19, 52/2.25, 2.24; 118/309, 312, 326, 634, DIG. 7; 55/290, DIG. 46; 454/50; 428/178, 182; 410/119, 129

[56] References Cited

U.S. PATENT DOCUMENTS

| | | | |
|---|---|---|---|
| 2,841,073 | 7/1958 | Forshee | 98/115 |
| 2,875,680 | 3/1959 | Forshee | 98/115 |
| 3,071,060 | 1/1963 | Forshee | 98/115 |
| 3,252,401 | 5/1966 | Smith | 98/115 |

(List continued on next page.)

FOREIGN PATENT DOCUMENTS

| | | |
|---|---|---|
| 375511 | 12/1989 | European Pat. Off. . |
| 0402604A2 | 12/1990 | European Pat. Off. . |
| 828032 | 12/1951 | Fed. Rep. of Germany . |
| 7015283 | 8/1970 | Fed. Rep. of Germany . |
| 2704497 | 8/1978 | Fed. Rep. of Germany . |
| 2835474 | 2/1980 | Fed. Rep. of Germany . |
| 2134775 | 10/1980 | Fed. Rep. of Germany . |
| 7634370 | 11/1976 | France . |
| 657865 | 4/1979 | U.S.S.R. . |
| 1020591 | 2/1966 | United Kingdom . |
| 1315671 | 5/1973 | United Kingdom . |
| 8902788 | 4/1989 | World Int. Prop. O. . |

OTHER PUBLICATIONS

European Search Report, European Patent Application No. 92110614.2, Oct. 5, 1992.
PCT WO92/08549, May 29, 1992.
PCT WO89/02788, Apr. 6, 1989.
PCT/GB86/00447, Filed Jul. 28, 1986.

*Primary Examiner*—W. Gary Jones
*Assistant Examiner*—Dean Tan Nguyen
*Attorney, Agent, or Firm*—Barnes & Thornburg

[57] ABSTRACT

A powder coating booth and a construction method therefor comprise a pair of inflatable polymer walls defining between them a booth inner space, a booth entry end and a booth exit end, and supporting the inflatable walls in spaced orientation to define between them the booth inner space. A mechanism is provided between the walls for recovery of powder which does not adhere to articles conveyed through the booth inner space. The polymer walls comprise one or more cells. The step of providing the polymer walls comprises inflating the cells. The method also includes the step of covering the cells with a sheet of polymer film forming an envelope for the cells. Illustratively, the cells comprise a layer of bubble packaging material. Alternatively, the polymer walls comprise thermoformed cores and a polymer film envelope enveloping each core and closed to provide suitable inflation of each wall. Illustratively, the inflatable walls are supported in spaced orientation by a conventional powder spray booth. The inflatable walls are mounted to inside walls of the conventional spray booth by, for example, synthetic hook and eyelet material.

21 Claims, 24 Drawing Sheets

U.S. PATENT DOCUMENTS

| | | | |
|---|---|---|---|
| 3,294,387 | 12/1966 | Chavannes | 267/1 |
| 3,388,509 | 6/1968 | Mora | 52/2 |
| 3,395,972 | 8/1968 | Hardison | 23/4 |
| 3,690,298 | 9/1972 | Venturi | 118/629 |
| 3,691,991 | 9/1972 | Luderer et al. | 118/629 |
| 3,724,755 | 4/1973 | Diamond et al. | 239/15 |
| 3,744,450 | 7/1973 | Hardy | 118/326 |
| 3,777,706 | 12/1973 | Kaufman | 118/603 |
| 3,814,002 | 6/1974 | Rombach et al. | 98/115 SB |
| 3,870,016 | 3/1975 | Schneider | 118/309 |
| 3,899,311 | 8/1975 | Rapp | 55/283 |
| 3,902,455 | 9/1975 | Lehmann et al. | 118/630 |
| 3,905,785 | 9/1975 | Fabre | 55/96 |
| 3,918,641 | 11/1975 | Lehmann et al. | 239/15 |
| 3,924,363 | 12/1975 | Candle | 52/2 |
| 3,942,420 | 3/1976 | Marino | 98/115 |
| 4,021,972 | 5/1977 | Choate et al. | 52/2 |
| 4,094,654 | 6/1978 | Prinzing | 55/290 |
| 4,245,551 | 1/1981 | Berkmann | 98/115 SB |
| 4,257,345 | 3/1981 | Brice | 118/634 |
| 4,277,260 | 7/1981 | Browning | 55/273 |
| 4,323,030 | 4/1982 | Lehmann, Jr. | 118/326 |
| 4,325,745 | 4/1982 | Milevski | 134/4 |
| 4,354,451 | 10/1982 | Vohringer et al. | 118/326 |
| 4,357,900 | 11/1982 | Buschor | 118/681 |
| 4,378,728 | 4/1983 | Berkmann | 98/115 SB |
| 4,401,445 | 8/1983 | Browning | 55/96 |
| 4,402,279 | 9/1983 | Witte et al. | 118/326 |
| 4,409,009 | 10/1983 | Lissy | 55/302 |
| 4,430,956 | 2/1984 | Koch, II | 118/326 |
| 4,471,715 | 8/1984 | Gubler et al. | 118/324 |
| 4,506,625 | 3/1985 | Vohringer | 118/312 |
| 4,545,324 | 10/1985 | Browning | 118/634 |
| 4,548,967 | 10/1985 | Brown et al. | 524/56 |
| 4,695,501 | 9/1987 | Robinson | 428/159 |
| 4,715,314 | 12/1987 | Ramseier et al. | 118/631 |
| 4,748,049 | 5/1988 | Charles et al. | 427/156 |
| 4,764,220 | 8/1988 | Dinkel et al. | 134/6 |
| 4,825,807 | 5/1989 | Nakamura et al. | 118/672 |
| 4,852,513 | 8/1989 | Hayes | 118/236 |
| 4,934,308 | 6/1990 | Boyce et al. | 118/326 |

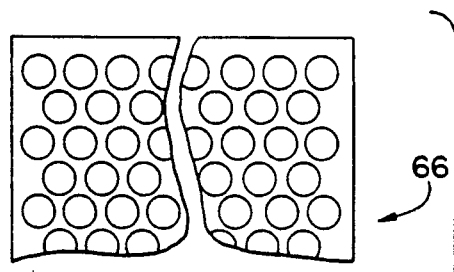
FIG.8a
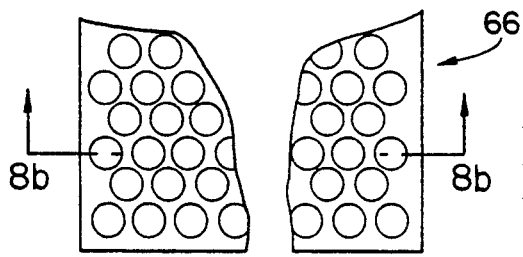
FIG.8b
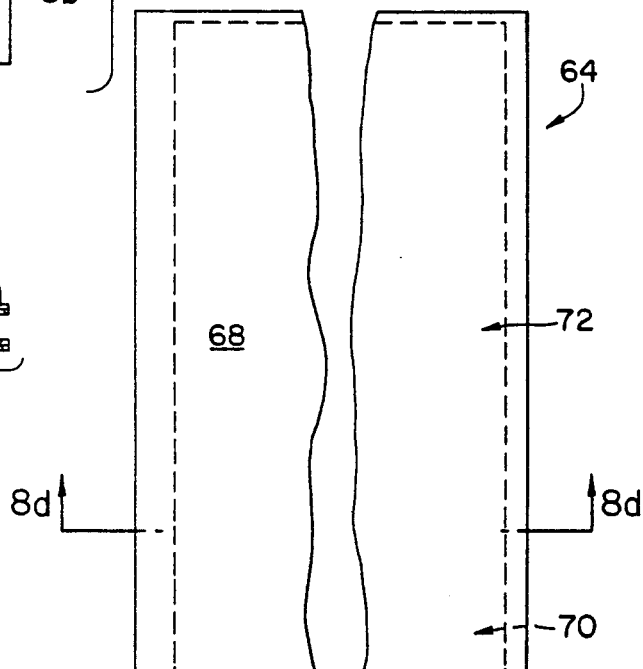
FIG.8c
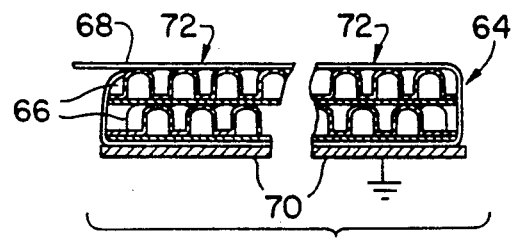
FIG.8d

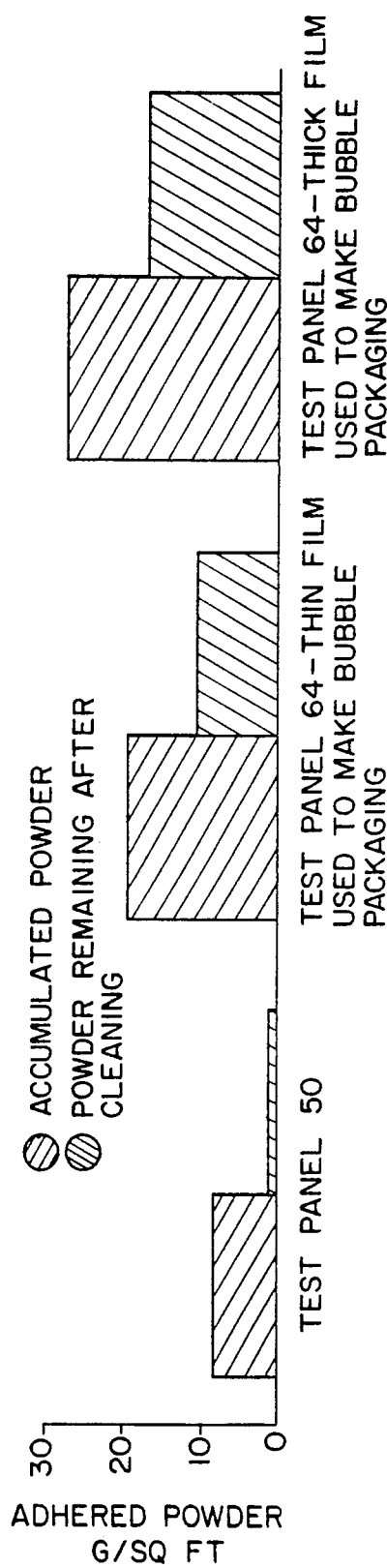
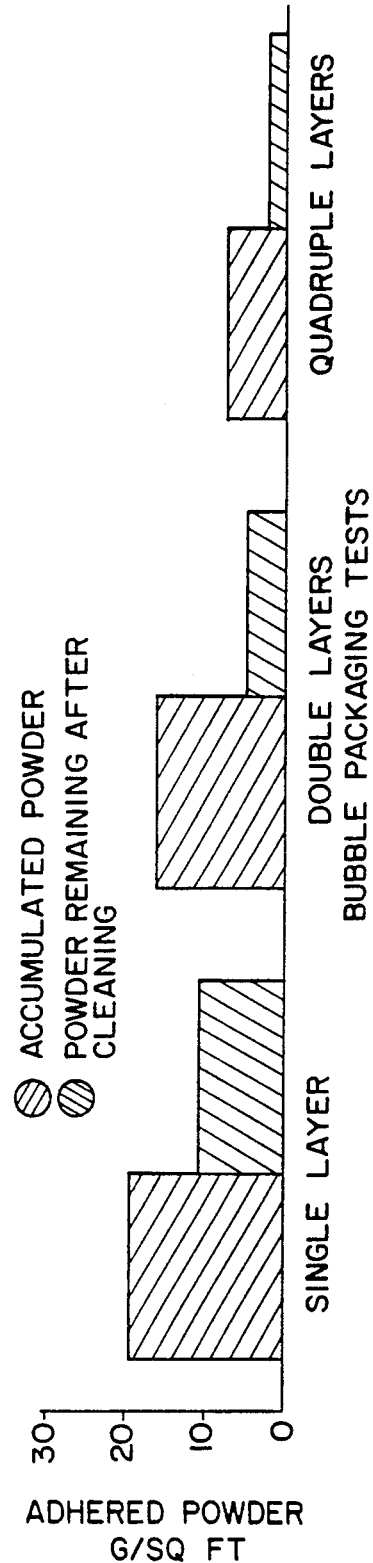

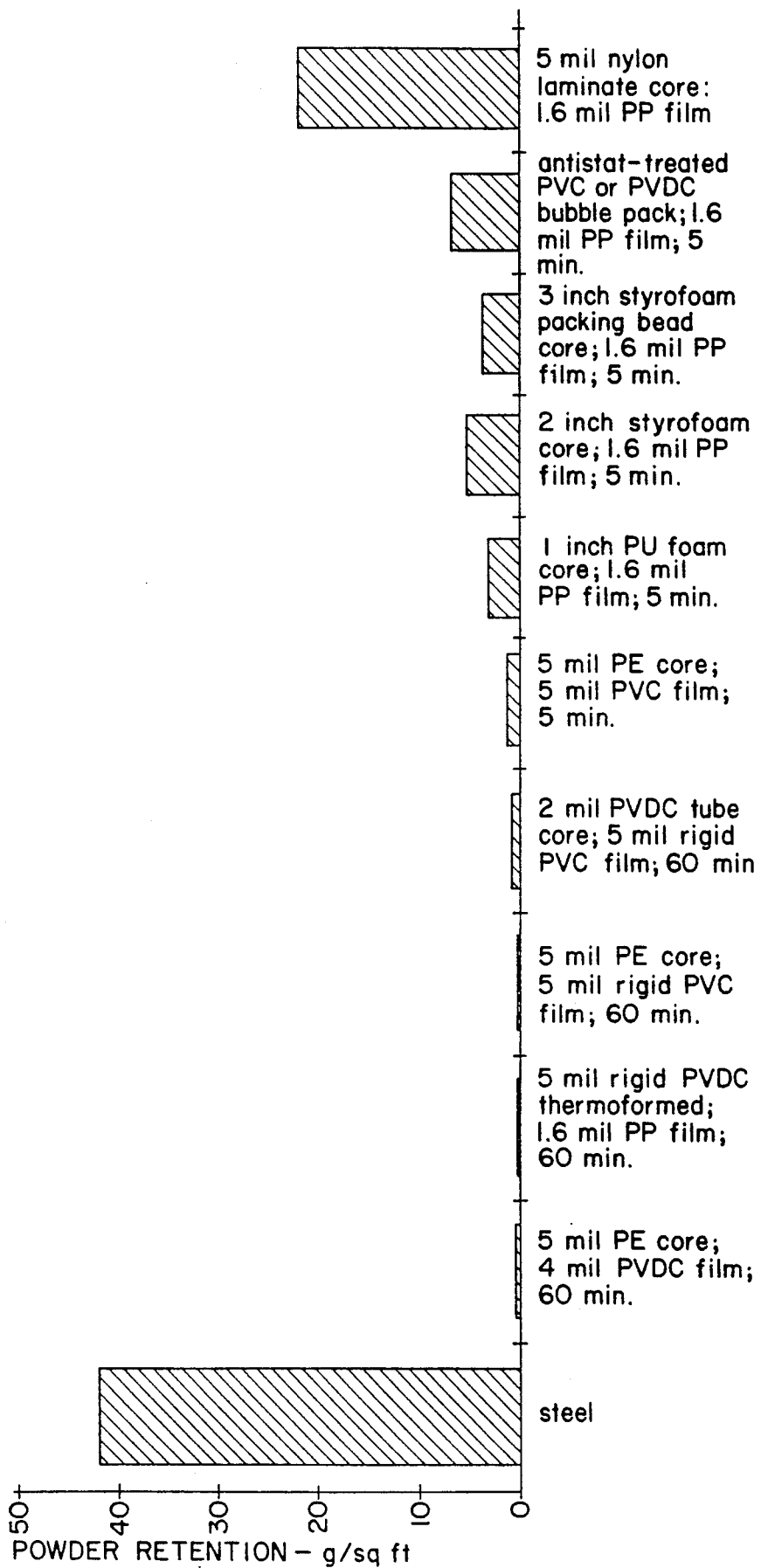

FIG.22a
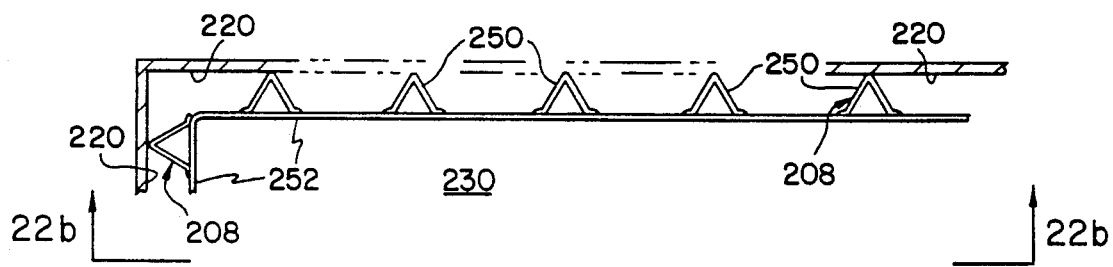
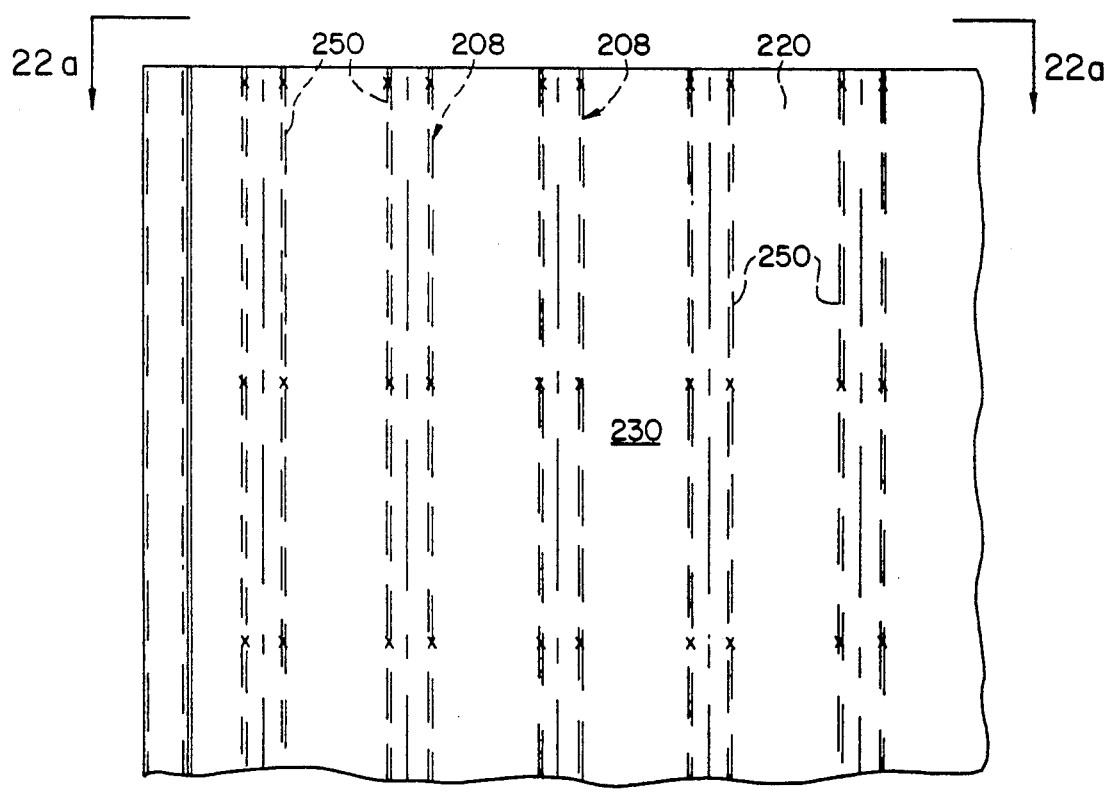
FIG.22b

POWDER APPLICATION BOOTH LINER AND METHOD OF MAKING IT

This is a continuation in part of our earlier filed and co-pending U.S. Ser. No. 07/722,092 filed Jun. 27, 1991, titled POWDER APPLICATION BOOTH LINER AND METHOD OF MAKING IT, assigned to the same assignee as this application now abandoned.

This invention relates to coating material application booth wall constructions which clean quickly and easily, and therefore permit quick color changes for electrically charged powder coating materials.

Existing powder booths typically are made from heavy sheet metal or single layers of resins thick enough to be self-supporting. The booth walls are typically maintained at ground potential. Since the walls are at ground potential, they attract significant amounts of oversprayed, charged powder which loses some of its charge through the walls, and adheres to the walls owing to the remaining electrostatic charge. This renders cleaning very difficult. Cleaning difficulties become more problematic in situations in which frequent powder type or color changes are necessary or desirable. Powder coating materials are rather expensive and, where possible, overspray is captured and recycled. Of course, if powder coating material color is changed in such a recycling system, the recycling system must be completely cleaned of the pre-change color to avoid cross-contamination of the pre- and post-change colors. A typical cleaning operation consists of using a squeegee to remove most of the accumulated powder, followed by compressed air cleaning to further reduce adhered powder particles, and finally damp cloth cleaning or vacuuming to remove any residue.

Coating booths for the capture of overspray are known. There are, for example, the coating booths described in the following listed U.S. Pat. Nos. 4,934,308; 4,852,513; 4,764,220; 4,715,314; 4,545,324; 4,506,625; 4,471,715; 4,430,956; 4,409,009; 4,402,279; 4,401,445; 4,378,728; 4,357,900; 4,354,451; 4,323,030; 4,277,260; 4,257,345; 4,245,551; 4,094,654; 3,942,420; 3,918,641; 3,905,785; 3,902,455; 3,899,311; 3,870,016; 3,814,002; 3,777,706; 3,744,450; 3,724,755; 3,071,060; 3,691,991; 3,690,298; 3,395,972; 3,252,401; 2,875,680; and, 2,841,073; and the following international and foreign patent publications: PCT/GB86/00447; EP 0 402 604 A2; British Patent Specification 1,315,671; British Patent Specification 1,020,591; German OLS 2,835,474; German OLS 2,704,497; German AS 2,134,775; German Patent Specification 828,032; German GM 70 15,283; Soviet Union Patent Specification 657,865; and, French Patent Application 76 34,370. It is also known to coat the walls of coating booths with compositions to promote cleaning of the coating booths, and to coat strip and sheet metal coils with anti-sticking agents. See, for example, U.S. Pat. Nos. 4,825,807; 4,748,049; 4,548,967; and, 4,325,745. No representation is intended, nor should any such representation be inferred, that the above listing is a complete listing of all of the pertinent prior art, or that a thorough search of the prior art has been conducted.

"Electrically non-conductive" and "electrically non-insulative" are relative terms. In the context of this application, "electrically non-conductive" means electrically less conductive than "electrically non-insulative." Conversely, in the context of this application, "electrically non-insulative" means electrically more conductive than "electrically non-conductive."

According to one aspect of the invention, a powder coating booth comprises a pair of inflatable, non-polyamide, non-polyurethane polymer walls defining between them a booth inner space, a booth entry end and a booth exit end, and a mechanism for recovery of powder which does not adhere to articles conveyed through the booth inner space. The powder recovery mechanism lies between the walls.

Illustratively, the booth further comprises means for supporting the inflatable walls in spaced orientation to define between them the booth inner space.

Additionally, illustratively, the means for supporting the inflatable walls in spaced orientation comprises a framework of supports and means for attaching the walls to the supports.

According to an illustrative embodiment, the means for attaching the walls to the supports comprises rings provided on the walls for placement around respective supports of the framework.

Accordingly to other illustrative embodiments, the means for attaching the walls to the supports comprises adhesive for attaching the walls to the supports of the framework.

Illustratively, the non-polyamide, non-polyurethane polymer walls comprise means defining one or more cells, means for inflating the cells, and a film for covering the means defining one or more cells.

According to illustrative embodiments the means defining one or more cells and the means for inflating the cells together comprises a layer of bubble packaging material.

Illustratively, the film for covering the means defining one or more cells comprises a sheet of non-polyamide, non-polyurethane polymer film forming an envelope for the means defining one or more cells.

According to illustrative embodiments, the means for supporting the inflatable walls in spaced orientation comprises a somewhat rectangular prism-shaped walled structure, and means for mounting the inflatable walls to inside walls of the structure.

Illustratively, the means for mounting the inflatable walls to inside walls of the structure comprises synthetic hook and eyelet material, the hook material being mounted on one of the inflatable wall and structure and the eyelet material being mounted on the other of the inflatable wall and structure.

According to other illustrative embodiments, the non-polyamide, non-polyurethane polymer walls comprise thermoformed cores and a non-polyamide, non-polyurethane polymer film envelope enveloping each core and closed to provide suitable inflation of each wall.

Illustratively each core comprises a web region in which are formed a plurality of cup-shaped structures.

According to another aspect of the invention, a powder coating booth consists essentially of sheets of non-polyamide, non-polyurethane polymer film for forming the booth walls, an electrically non-conductive framework supporting the film as two spaced walls defining between them a booth inner space, and a mechanism for recovery of powder which does not adhere to articles conveyed through the booth inner space. The powder recovery mechanism lies between the walls.

Illustratively according to this aspect of the invention, the framework comprises resin framework members and adhesive for attaching the film to at least selected framework members.

According to another aspect of the invention, a powder coating booth construction method comprises the steps of providing a pair of inflatable, non-polyamide, non-polyurethane polymer walls and supporting the walls in spaced apart orientation to define between them a booth inner space, a booth entry end and a booth exit end.

Illustratively, according to this aspect of the invention, the method further comprises the step of providing between the walls a mechanism for recovery of powder which does not adhere to articles conveyed through the booth inner space.

Additionally illustratively according to this aspect of the invention, the step of supporting the inflatable walls in spaced orientation comprises providing a framework of supports and attaching the walls to the supports.

Further according to this embodiment of the invention, the step of attaching the walls to the supports illustratively comprises providing rings on the walls for placement around respective supports of the framework.

Illustratively according to this embodiment of the invention, the step of attaching the walls to the supports comprises applying adhesive between the walls and supports of the framework.

Additionally illustratively according to this aspect of the invention, the step of providing non-polyamide, non-polyurethane polymer walls comprises providing walls defining one or more cells covered by a film, and inflating the cells.

Further illustratively according to this aspect of the invention, the steps of providing one or more cells and inflating the cells together comprise the step of providing a layer of bubble packaging material.

According to this aspect of the invention the step of providing cells covered by a film illustratively comprises the step of providing cells covered by a sheet of non-polyamide, non-polyurethane polymer film forming an envelope for the one or more cells.

Illustratively according to this aspect of the invention, the step of supporting the inflatable walls in spaced orientation comprises providing a somewhat rectangular prism-shaped walled structure, and mounting the inflatable walls to inside walls of the structure.

Additionally according to this aspect of the invention, the step of mounting the inflatable walls to inside walls of the structure illustratively comprises providing synthetic hook and eyelet material, mounting the hook material on one of the inflatable wall and structure, and mounting the eyelet material on the other of the inflatable wall and structure.

Further according to this aspect of the invention, the step of providing non-polyamide, non-polyurethane polymer walls illustratively comprises the steps of providing thermoformed cores and a non-polyamide, non-polyurethane polymer film envelope, and closing a respective envelope around each core to provide suitable inflation of each wall.

According to this aspect of the invention, the step of providing thermoformed cores comprises the step of providing a web region in which are formed a plurality of cup-shaped structures.

According to yet another aspect of the invention, a powder coating booth construction method consists essentially of providing sheets of non-polyamide, non-polyurethane polymer film for forming the booth walls, providing an electrically non-conductive framework supporting the film as two spaced walls defining between them a booth inner space, and providing between the walls a mechanism for recovery of powder which does not adhere to articles conveyed through the booth inner space.

Illustratively, according to this aspect of the invention, the step of providing a framework comprises the step of providing resin framework members and adhesive for attaching the film to at least selected framework members.

The invention may best be understood by referring to the following description and the drawings which illustrate the invention. In the drawings:

BRIEF DESCRIPTION OF THE DRAWINGS

FIGS. 8a–d illustrate a fragmentary elevational view and a fragmentary sectional view of a core constructed according to the present invention, and a fragmentary elevational view and a fragmentary sectional view of an assembly constructed according to the present invention respectively;

FIG. 9 illustrates the relative performances of three structures according to the present invention;

FIG. 10 illustrates the relative performances of three structures according to the present invention;

FIG. 16 illustrates relative powder shedding capabilities of a number of panels constructed according to the invention using different materials;

FIGS. 22a-b illustrate fragmentary plan and elevational views, respectively, of a coating material application booth containing a liner constructed according to the invention;

Figure 1:
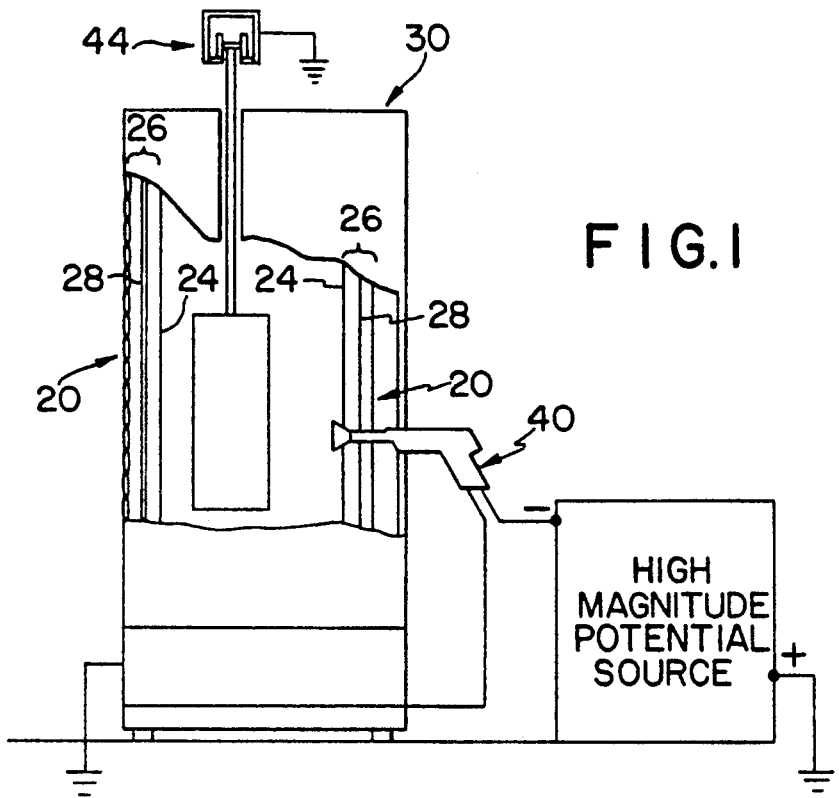
FIG. 1 illustrates a partly diagrammatic, partly broken away end elevational view of a coating booth incorporating a structure according to the present invention.

The hollow wall structure 20 of FIG. 1 according to the present invention demonstrates superior cleaning performance over prior art structures. Only trace amounts of coating powder are left even after long powder spray durations and after cleaning with an air jet. For example, powder residue on wall 24 of structure 20 after cleaning is less than 0.5 g/ft² (about 5.4 g/m²). A space 26 is maintained by a suitable non-conductive standoff 28 between the prior art grounded sheet metal outer booth 30 and the interior wall surface 24. Additionally, the overall mass of the wall structure 20 is kept to a minimum. The interior wall surface 24 is made from polyethylene (PE) or polypropylene (PP) film of 1-6 mil (about 0.03-0.15 mm) thickness. A number of different constructions were tested.

A Gema Volstatic model AP761 powder spray gun 40 a with one inch (2.54 cm) diameter deflector tip, model 701-6 power supply 42, and model CRS-H powder booth 30 were employed in the following examples. Most comparative tests were run using a gray appliance polyester powder (Glidden Pulvalure #159), although the paint shedding effect discussed in certain of the following examples was noticed with other powder types as well. Test panels 50 (FIGS. 2a-b) were employed in certain of the following examples. The test panel 50 dimensions were approximately 2 ft by 2 ft by 2 inches (about 61 cm by 61 cm by 5.1 cm), and the test panels 50 were attached, for example, by double sided adhesive, to grounded sheet steel panels 52 of roughly the same dimensions. Unless otherwise noted, paint powder delivery was about 200 g/min at a 1 ft (about 31 cm) distance from the test panel 50, and charging potential was 90-100 kV. Typical spray durations recorded were 5, 30, and 60 minutes. The test panels 50 were suspended from the booth 30's conveyor system 44 and booth 30's filter cleaning system was turned off during accumulation and cleaning trials, since it was noticed that the vibrations resulting from filter cleaning caused powder to cascade off the test panels 50 in certain of the examples. Cleaning data was obtained by weighing test panels 50 after blowing them for 15 seconds with 25-30 psig (about 17.2-20.7 nt/cm² gauge) air at a 2 ft. (about 61 cm) nozzle-to-target (test panel) spacing.

Examples I—Comparisons of Materials

Figures 2A, 2B:
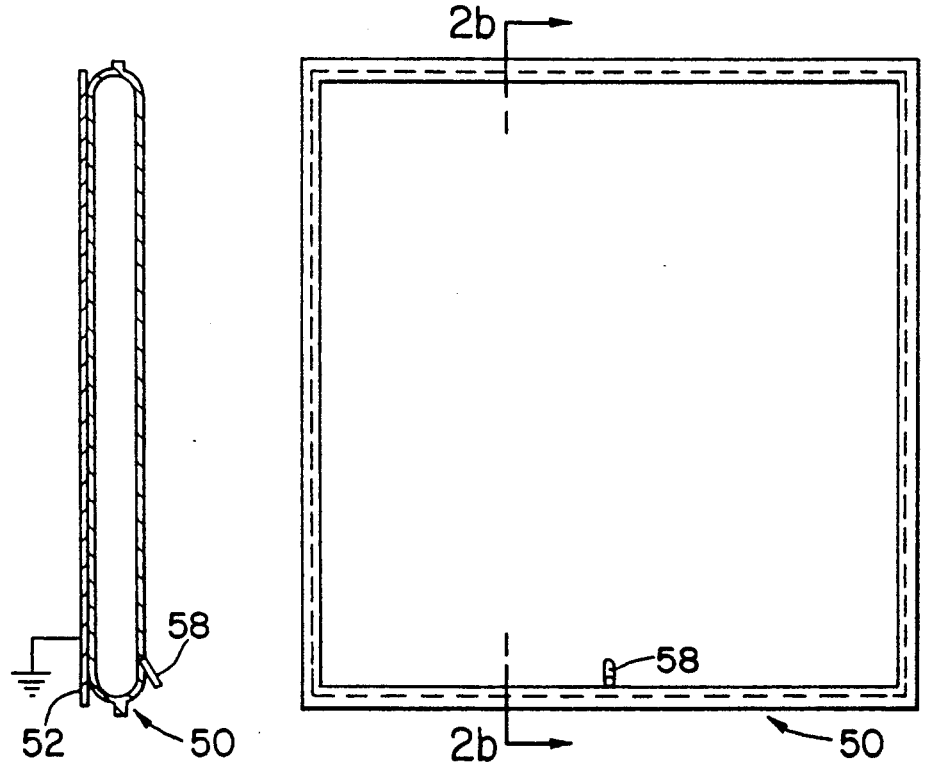
FIGS. 2a–b illustrate elevational and sectional views, respectively, of a test panel constructed to test a concept underlying the present invention.

After a 60 minute powder coating trial, the PP test panel 50 of FIGS. 2a-b accumulated 18 g/ft² (about 193.7 g/m²) of coating powder and cleaned to <0.5 g/ft² (<about 5.4 g/m²) of coating powder. A PP sheet placed directly against a grounded sheet steel panel 52 accumulated about 100 g/ft² (about 1.076 Kg/m²) of coating powder and cleaned to 42 g/ft² (about 452 g/m²) of coating powder.

Another example was run, substituting a 4 mil (about 0.1 mm) Gema Volstatic antistat treated PE film to create the test panel structure 50 instead of the PP film of FIGS. 2a-b. The antistat treated PE film accumulated 70 g/ft² (about 753.5 g/m²) of coating powder and cleaned to 20 g/ft² (about 215.3 g/m²) after a 60 minute spray trial. Since examples employing PE films with no antistat treatment shed paint at levels comparable to PP films with no antistat treatment, it appeared that the antistat additive was responsible for the relatively poorer cleaning performance of this example.

Figure 3:
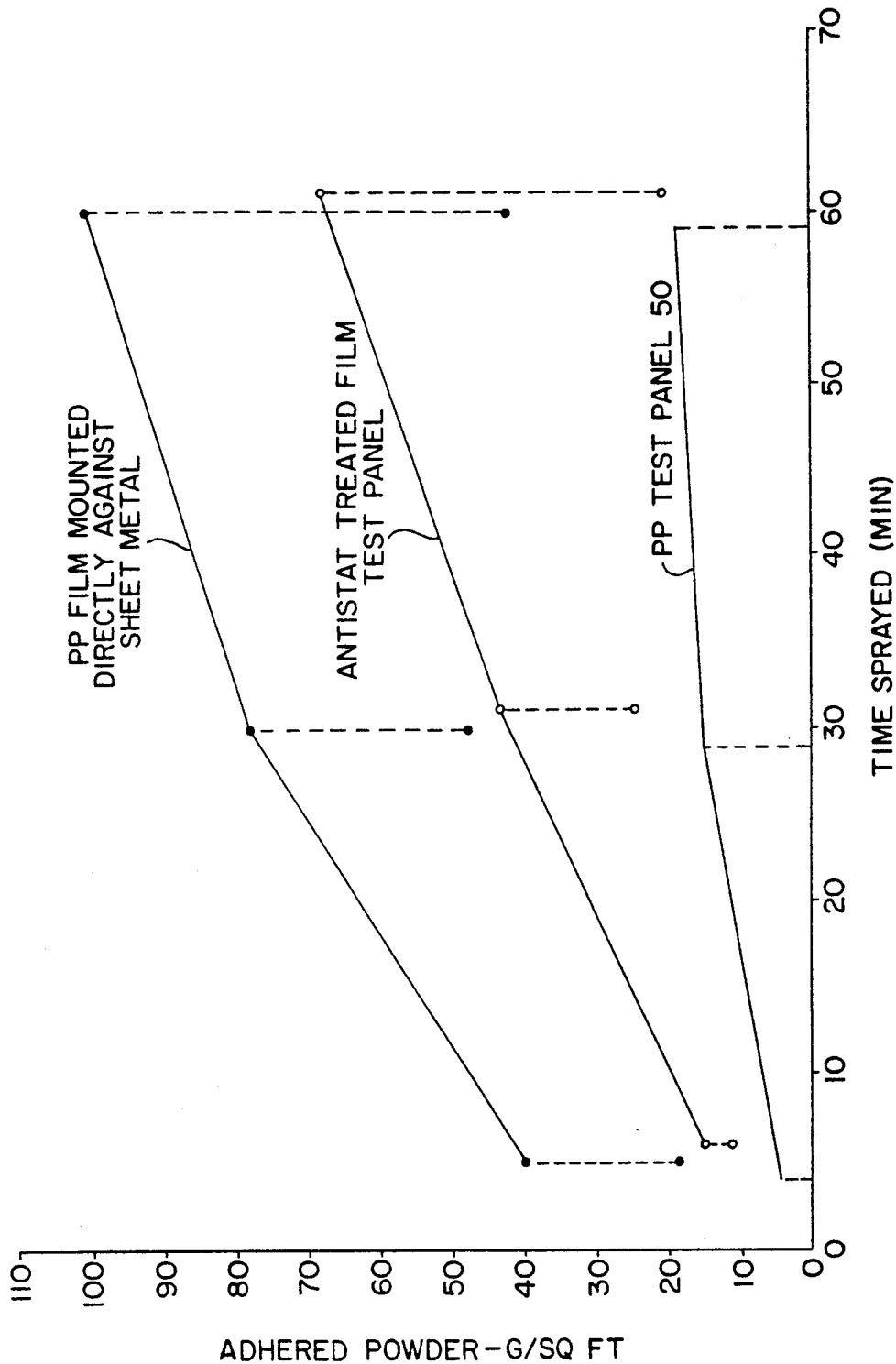
FIG. 3 illustrates the relative performances of the test panel of FIGS. 2a–b and other test structures.

The above examples' panels were weighed at various spray intervals, and this information indicated that, after an initial powder accumulation, the PP test panel 50 showed almost no powder accumulation after cleaning with an air jet. This was not the case for either the PP sheet placed directly against a grounded sheet metal panel 52 or the antistat-treated PE film test panel 50. These data are plotted in FIG. 3.

Besides easier booth cleaning, the powder shedding property offers commercial benefits in, for example, a booth in which a rotating belt floor continually recycles cascaded powder. Instead of generating a thick build-up on the booth walls, powder can be agitated to the floor for immediate recycling. Also, agitating the booth's roof panels during coating eliminates large powder build-ups, which prevents built-up powder on the roof panels from falling onto and blemishing conveyed parts.

Example II—Surface Film Orientation

Figure 4:
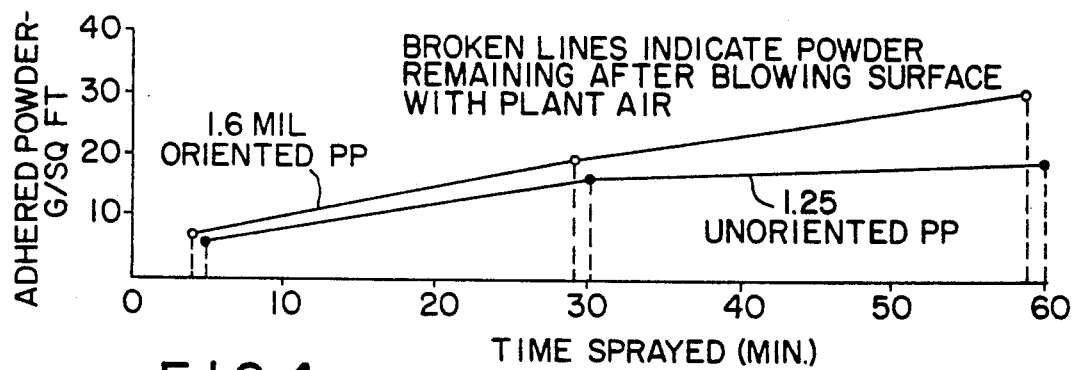
FIG. 4 illustrates the relative performance of two structures according to the present invention.

Two PP films of approximately the same thickness were tested. One sample was 1.6 mil (about 0.04 mm) biaxially oriented PP. The other was 1.25 mil (about 0.03 mm) unoriented PP. Powder spray trials on test panels similar in configuration to panels 50 of FIG. 2 made using each of these materials indicated that both test panels cleaned to <0.5 g/ft² (about 5.4 g/m²). FIG. 4 illustrates these results. PP film orientation did not appear to affect powder cleaning ability.

Example III—Film Surface Treatment

Figure 5:
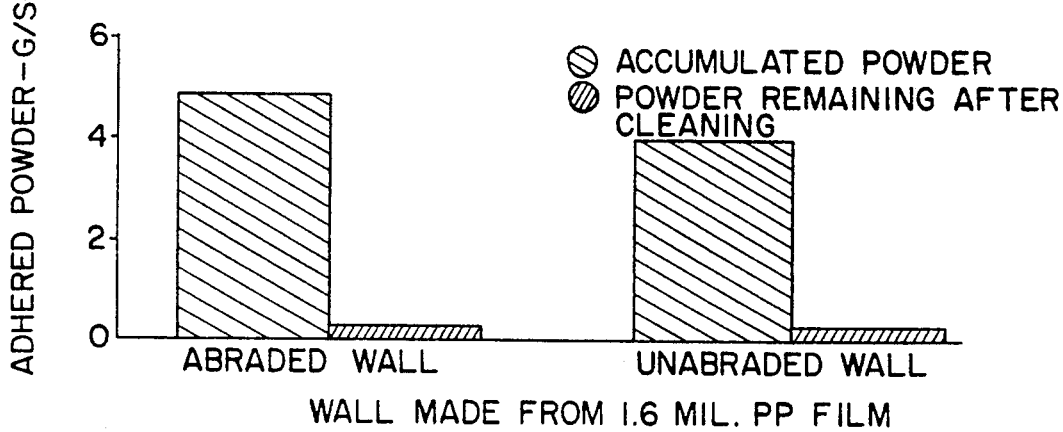
FIG. 5 illustrates the relative performance of two structures according to the present invention.

Abrading the powder contact surface of a 1.6 mil (about 0.04 mm) PP test panel 50 with coarse steel wool did not affect its ability to be cleaned. Results of this test are illustrated in FIG. 5. These results indicate that powder shedding ability does not appear to be related to surface smoothness.

Example IV—Film Thickness

Figure 6:
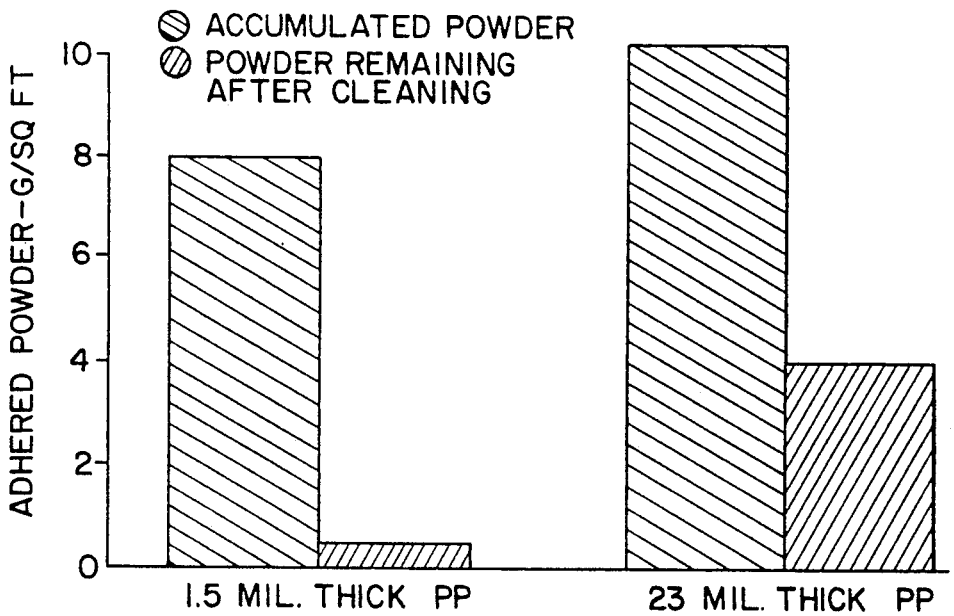
FIG. 6 illustrates the relative performance of two structures according to the present invention.

Comparisons were made between a test panel similar in configuration to test panel 50 of FIG. 2, but constructed with 23 mil (about 0.6 mm) thick PP and a test panel 50 constructed using 1.6 mil (about 0.04 mm) thick PP. The test panel constructed using 23 mil (about 0.6 mm) thick PP accumulated over 10 g/ft$^2$ (about 107.6 g/m$^2$) and cleaned to 4 g/ft$^2$ (about 43.1 g/m$^2$) in a 5 minute powder spray trial. The test panel 50 constructed using 1.6 mil (about 0.04 mm) PP accumulated 8 g/ft$^2$ (about 86.1 g/m$^2$) and cleaned to <0.5 g/ft$^2$ (about 5.4 g/m$^2$). These results are illustrated in FIG. 6. This indicates that thinner film cleans better than thicker.

Figure 7:
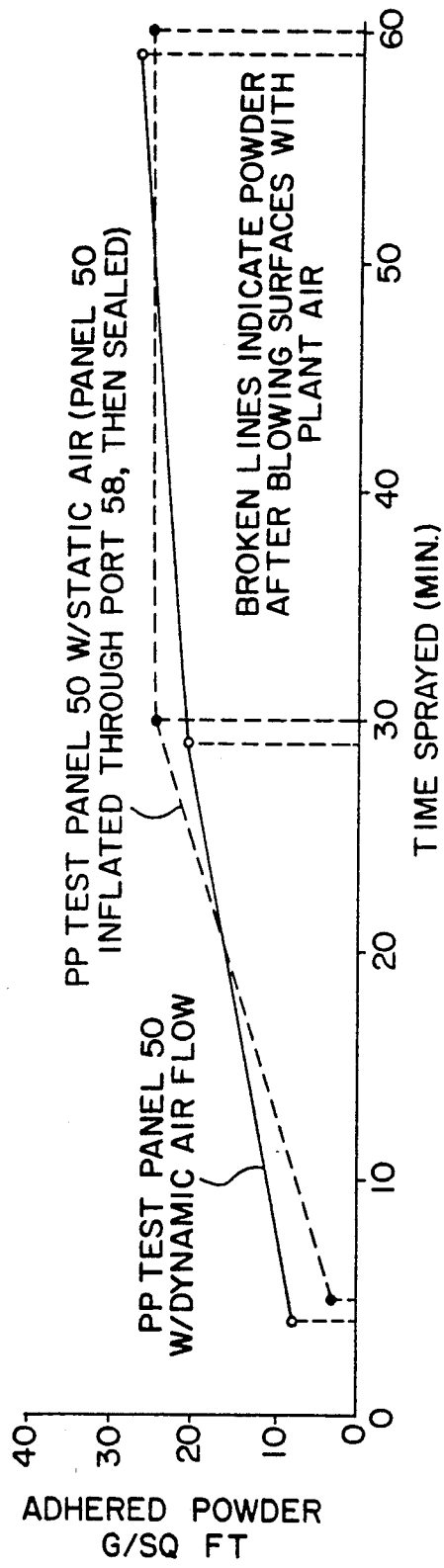
FIG. 7 illustrates the relative performance of two structures according to the present invention.

Example V—The Effect of Blowing Air Between the Film and the Metal Booth Wall Initially, the test panel 50 was kept inflated by blowing air into one of its sides through a port continuously, and letting the air exit through ports on an opposite side. A test was conducted to determine if similar results could be attained with the construction of FIGS. 2a-b in which the test panel 50 was inflated to a desired thickness and sealed shut. These data, illustrated in FIG. 7, indicated no significant difference in the ability of test panels inflated by the two described methods to be cleaned.

Several different test panel embodiments were then constructed. The first 64 (FIGS. 8a-d) employed bubble packaging material 66 to space the PP film 68 from grounded sheet metal 70. Te PP outer wrap 68 around the bubble packaging material 66 provided a smooth surface 72 on which the powder accumulated. Test results using one layer of bubble packaging material 66 one-half inch (12.5 mm) thick with PP outer wrap 68 are illustrated in FIG. 9. These data indicate that a single ½ inch (12.5 mm) thick layer of bubble packaging material 66 does not perform as well as the PP test panel 50 of Examples I in either accumulation or cleaning. Also, it was noticed that bubble packaging material produced using thicker plastic films performed worse than bubble packaging material produced using thinner films. This indicated that added mass does not contribute to the goals of minimum accumulation and easy cleaning. Some additional samples were tested. In these additional samples, the bubble packaging material 66 was used in double and quadruple layers. In the case of doubling, the PP outer wrap 68 was about one inch (2.54 cm) from the grounded plate 70, while the quadrupled sample provided a spacing of about 2 inches (5.1 cm) between the PP outer wrap 68 and the grounded plate 70. FIG. 10 illustrates that cleaning results improved as the distance of the PP film 68 from ground 70 was increased.

Figure 12:
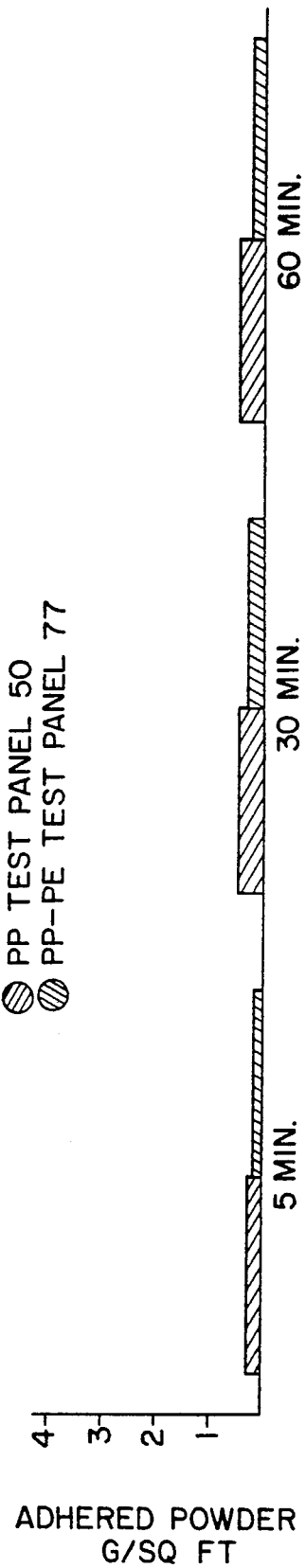
FIG. 12 illustrates the relative performances of three structures according to the present invention.
Figure 11A:
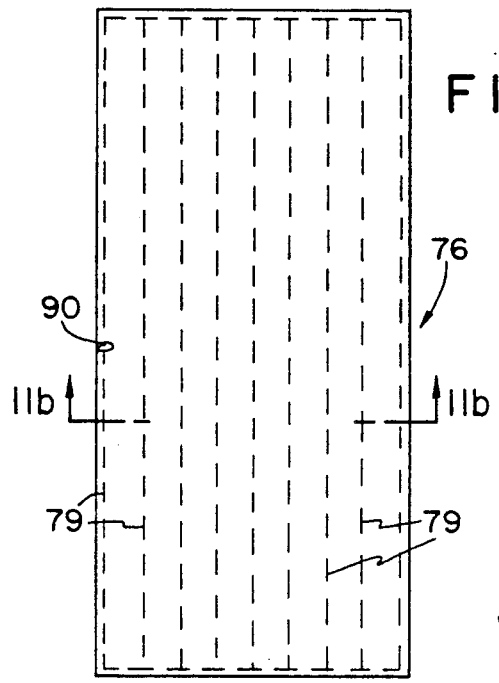
FIGS. 11a–d illustrate an elevational view and a sectional view of a core constructed according to the present invention, and an elevational view and a sectional view of a detail of the coating booth illustrated in FIG. 1 respectively.
Figure 11C:
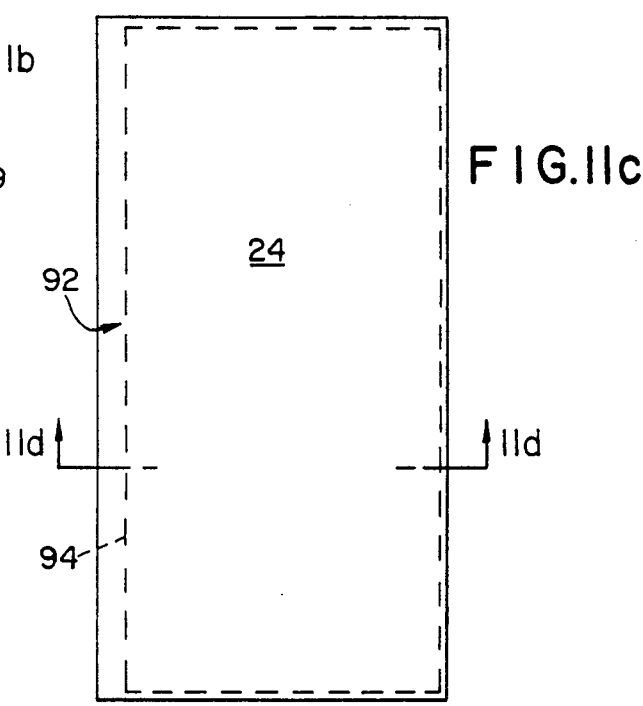
Figure 11B:
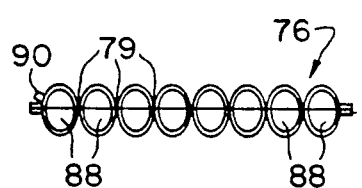
Figure 11D:
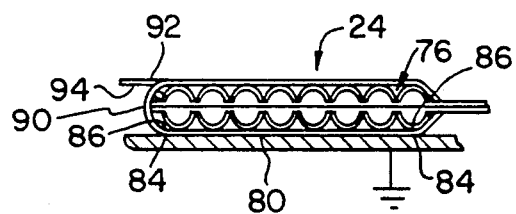

A preferred embodiment 28 of the invention was then made from an air mattress-style inflatable core 76 with a PP film outer wrap 24, as illustrated in FIGS. 11a-d. This embodiment provided approximately 2 inches (5.1 cm) distance from grounded sheet metal 80 to powder contact at 24. Results from powder coating trials indicated that embodiment 28 cleaned as well as the PP layer test panel 50 of FIG. 2. These results are illustrated in FIG. 12. Hollow wall structures 28 can be incorporated into existing heavy sheet metal powder booths 30 to reduce the powder accumulation and booth 30 cleaning time significantly. One such structure 28 is constructed from 3 mil (about 0.08 mm) thick PE sheet fabricated into an inner core 76 which is heat sealed at 79 to resemble a tube air mattress when inflated. This core 76 is wrapped in 1.6 mil (about 0.04 mm) biaxially oriented PP 24. The structure 28 is mounted to the booth wall 80 using complementary synthetic hook-and-eyelet material strips 84, 86 on the PP outer wrap 24 and booth wall 80. This attachment scheme facilitates quick panel 28 removal and replacement. It is envisioned that quick color changes can be achieved by mechanically agitating the powder covered panels 28 to remove the majority of the adherent powder, and then detaching these panels 28 at 84, 86 and replacing them with a clean set. Alternately, it is possible that sufficient powder can be removed by agitation to permit color change without panel 28 replacement. As previously noted, sufficient vibration to knock a substantial portion of the deposited powder continuously from the panels 28 may be coupled to the panels through the booth walls 80 themselves from the booth powder recovery filter cleaning system.

Design 28 lends itself readily to retrofitting of existing powder spray booths 30, as well as use in new powder spray booths 30. About 26 3 ft by 9 ft (about 0.9 m by 2.7 m) panels 28 are required to cover the interior of a typical powder spray booth 30 completely. The presently preferred orientation of the panels 28 is with their cells and the separating heat sealed seams 79 extending vertically. This minimizes the structure 28's tendency to provide more horizontal surfaces on which deposited powder can collect.

The construction of a panel 28 is in two phases. The first is to make the inflatable core 76. This is made of PE on the order of 5 mils (about 0.13 mm) thick, in a construction similar to an air mattress. This results in several tubes 88, each approximately 2 inches (about 5.1 cm) in diameter, lying next to each other. This core 76 is air-tight, and is provided with an inflation port 90. The second phase is to wrap this core 76 in a film 24 of PP or other material that will provide satisfactory functional characteristics. This outer wrap 24 is smooth and is supported by the core 76 inside it. The outer wrap 24 is not bonded to the core 76 in any way. This avoids, to the extent possible, the creation of dimples, puckers or wrinkles in the outer wrap 24 which might otherwise impair the performance of the panel 28.

The resulting structure 28 provides the electrical characteristics that cause the shedding of electrically charged powder particles. The structure 28 is substantially uniform in thickness, and has the ability to hold its shape. This structure 28 can be attached to the interior of the powder application booth wall 80 with double sided tape, or the previously mentioned synthetic hook-and-eyelet material 84, 86.

The panels 28 are installed in edge abutting relation along the walls 80 of the powder application booth 30. The abutting edges of the panels are covered with strips 92 of PP film that are provided by excess outer wrap 24. Strips 92 are held in place on adjacent panels 28 with, for example, double sided adhesive or a tackifier on the side 94 of the strips 92 not presented to the powder particles.

The installation provides optimal shedding of oversprayed coating powder particles, permitting them to be collected and recycled, while helping to control cross-contamination of colors.

Figure 13A:
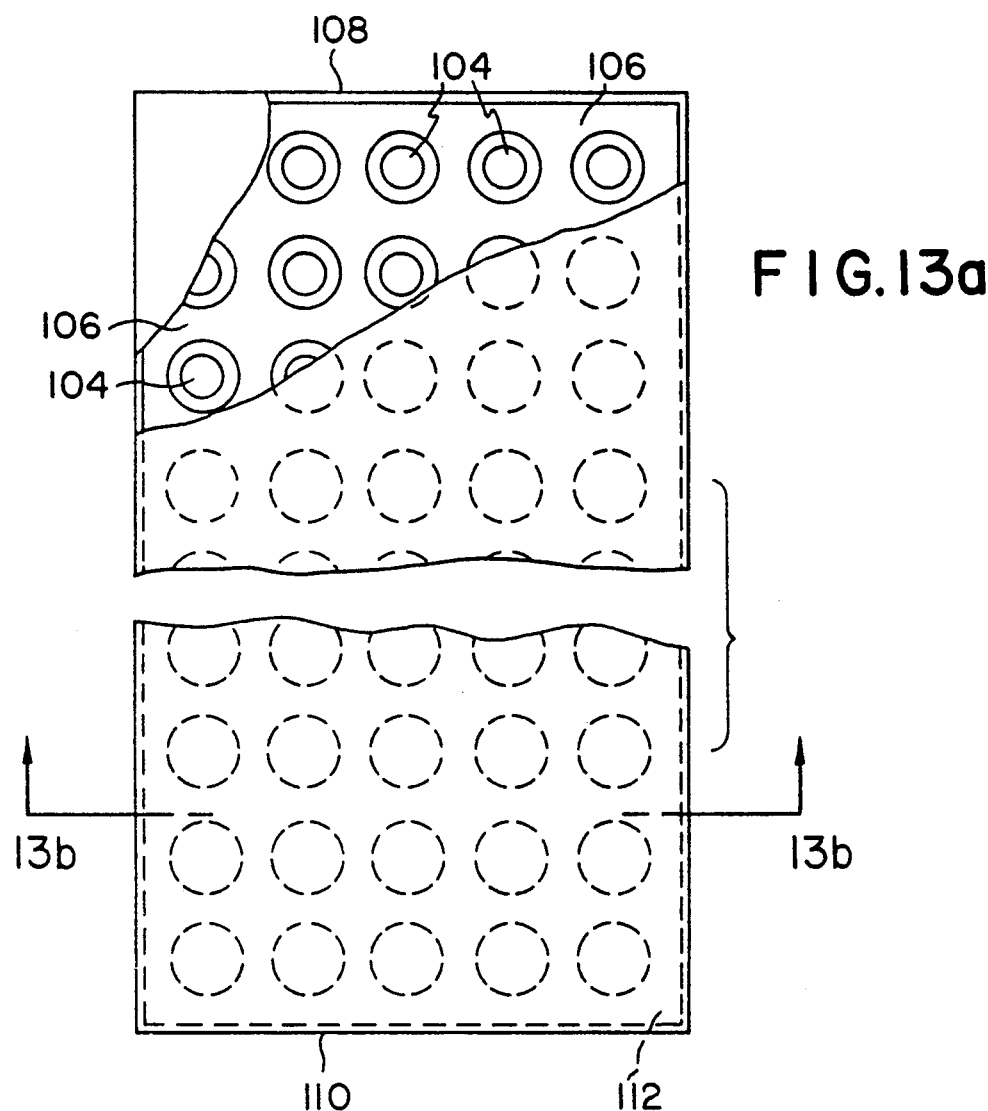
FIGS. 13a–b illustrate a fragmentary elevational view and a sectional view of an assembly constructed according to the invention.
Figure 13B:
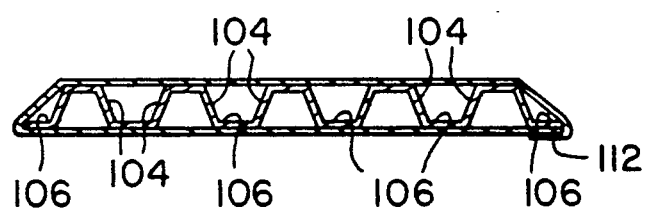

Another embodiment 100 of the invention is illustrated in FIGS. 13a–b. In this embodiment, an inner core 102 of a thermoplastic resin, such as 10-12 mil (0.25-0.3 mm) PE, is thermoformed to include tapered cup-shaped regions 104 approximately 3 inches (about 7.6 cm) in diameter and at least approximately 2 inches (about 5.1 cm) deep. Regions 104 are surrounded by a generally flat supporting web 106. A sheet 108 of resin, such as 2-3 mil (about 0.05-0.08 mm) thick PP, is wrapped around the thermoformed core 102 and sealed at its ends 108, 110 and along a side 112, illustratively by heat sealing. The structure 100 can then be removably attached to the coating booth wall by the synthetic hook and eyelet material or double sided tape previously discussed, or by providing resin hooks and hangers on the structure 100 and coating booth walls.

Example VI—Certain Operating Effects

It was noticed during the course of evaluating test panel 50 powder accumulation and ease of cleaning, that if a region of a panel collapsed during electrostatic powder coating, the region which had collapsed attracted more powder in subsequent trials. In addition, even after reinflation this previously collapsed region could not be cleaned as effectively as panel regions which had not previously collapsed. This effect could be reversed by exposing the previously collapsed region to ionized air of alternating polarity for an extended time period.

It has also been established that polyamide films and polyurethane films, for some reason, do not exhibit powder shedding capabilities to the high degree that the other polymer films tested do.

Example VII—The Effects of Inflating with Different Media

Test panel experiments began with negatively charged air being used to inflate the test panels 50. It was believed that negatively charged ions inside the test panels 50 might repel negatively charged coating powder particles directed against the test panels 50. Experiments were performed by blowing air into test panel 50 of FIGS. 2a–b using a Gema Volstatic model AP 761 powder gun. This gun had only air flow (no powder) and was set at 90-100 kV. Results were encouraging, since cleaning times using these conditions were substantially reduced. Next, tests were performed using various inflation media such as nitrogen, dry air, and plant air. Results indicated that electrically neutral (uncharged) plant air worked just as well as the other inflating media in providing good test panel 50 cleaning performance. Therefore, plant air was used to inflate the test panels 50 in all subsequent tests.

In a simple configuration, the booth 120 consists of sheets 122 of a non-polyamide, non-polyurethane polymer film, an electrically non-conductive framework 124 on which the film is hung to support it, and an endless powder recovery belt 126 for returning powder which does not adhere to articles passing through the booth 120 to a powder reclamation point. Such a configuration is illustrated in FIG. 14.

Figure 14:
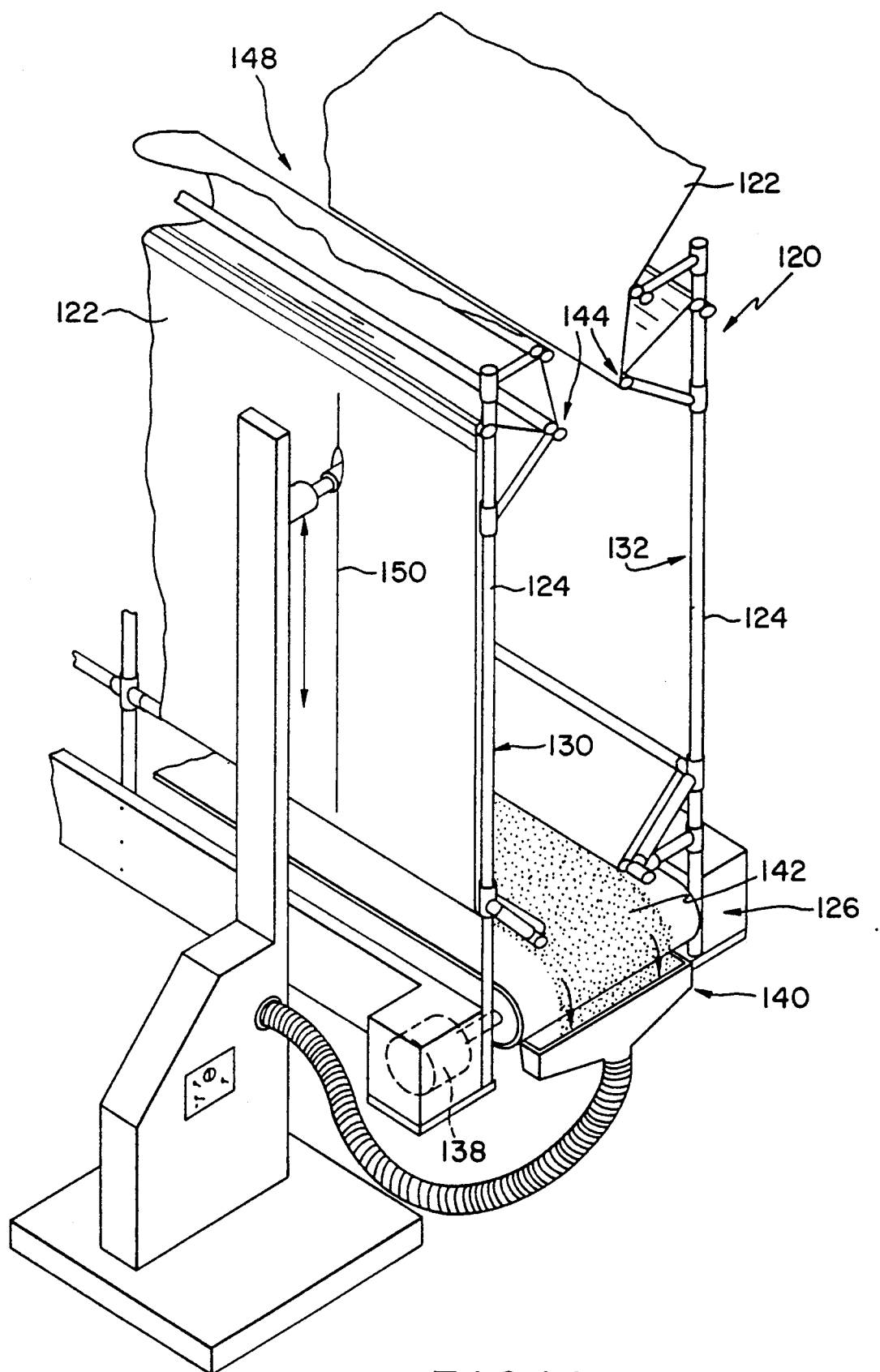
FIGS. 14–15 illustrate fragmentary perspective views of two booths constructed according to the present invention.

In FIG. 14, the side walls 130, 132 of the spray booth 120 are formed from an electrically non-conductive non-polyamide, non-polyurethane polymer film draped over an electrically non-conductive resin structural framework 124 which illustratively is constructed from polyvinyl chloride (PVC) plumbing conduit. The film is attached to the framework 124 by any suitable means, such as, for example, double sided adhesive tape. The floor of the booth 120 is formed by the continuous belt 126, which is driven by a prime mover 138, illustratively an electric motor, past a vacuum pick-up 140 at the downstream end of the upper run 142 of the belt 126. The tops 144 of the booth walls 130, 132 are spaced to provide a central, longitudinally extending slot opening 148 through which articles suspended by hangers from an overhead conveyor pass for coating by the powder being dispensed by a powder dispenser 150, such as a model AP761 powder spray gun. Air movement in the facility in which the booth 120 is located rustles the film, which is extremely light, and is enough to prevent the accumulation on the booth walls 130, 132 of powder which does not adhere to the articles passing through the booth 120.

Figure 15:
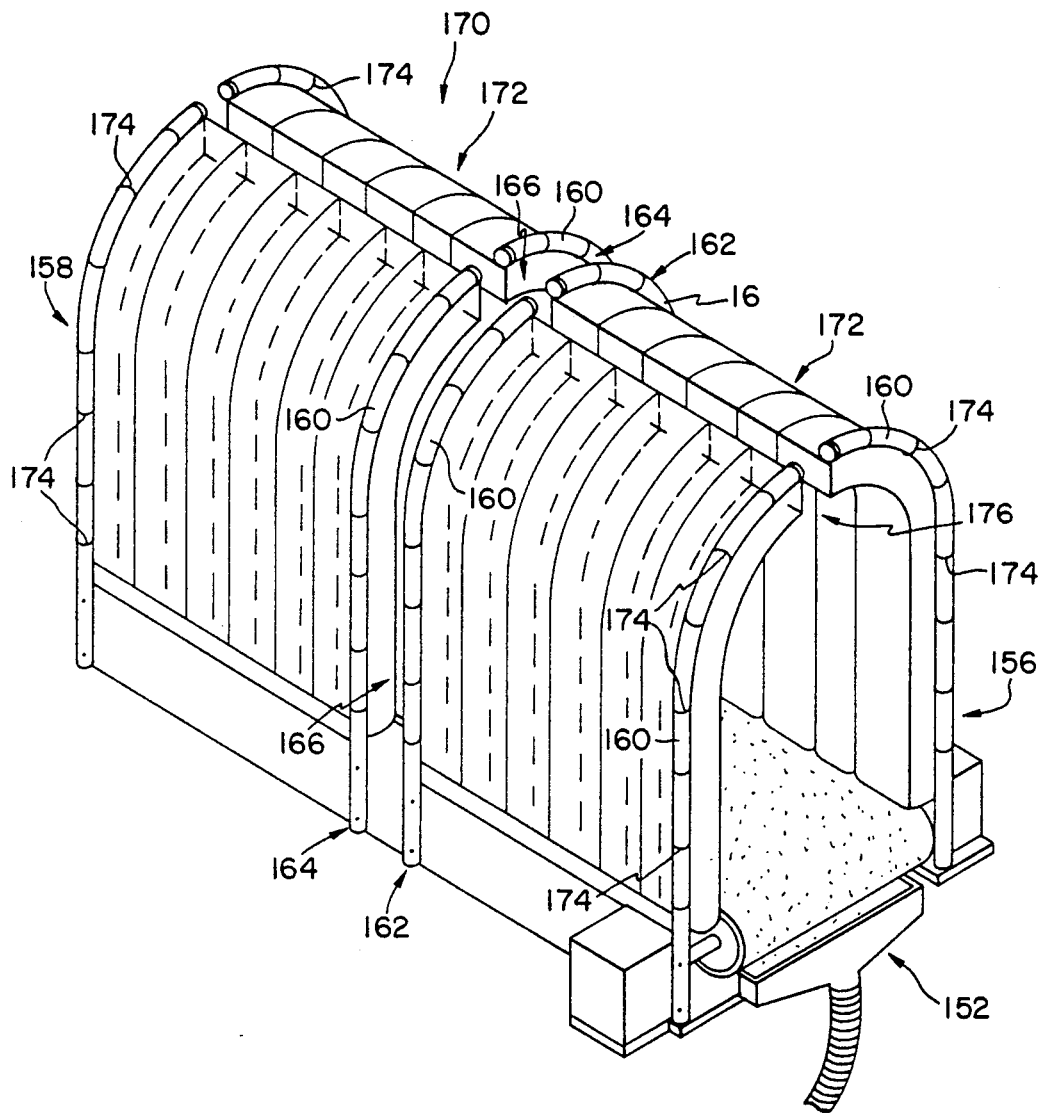

The "bubble pack" or "air mattress" configuration panels of FIGS. 8a–d, 11a–d or 13a–b can be employed in another embodiment of the invention best illustrated in FIG. 15. Once again, a base 152 of known configuration, such as the filter belt 126 of FIG. 14 or other suitable type of powder recovery system, is employed, The supporting framework 154 in this instance comprises two rows 156, 158 of vertically extending, electrically non-conductive (e.g. PVC) rods or conduits 160 spaced along the length of the base 152. The upper ends of rods or conduits 160 of each row 156, 158 are curved toward rods or conduits 160 of the opposite row 156, 158. Certain ones 162, 164 of rods or conduits 160 are closely spaced longitudinally from each other to define vertically extending slots 166 through which powder dispensers of known types project to dispense powder onto articles conveyed through the booth 170 of FIG. 15 on an overhead conveyor. The panels 172 are suspended on the insides of the framework members 160 by any suitable means, such as resin curtain rings 174 or double sided adhesive tape. The articles are suspended from the conveyor on suitable hangers that extend through the longitudinal slot opening 176 defined between the upper ends of the supporting rods or conduits of the opposing rows 156, 158. Again, air movement within the facility where the booth 170 is housed may be sufficient to stir the panels 172 enough to prevent the accumulation on the panels 172 of powder which does not adhere to the articles passing through the booth 170. If experience establishes that there is not enough air movement to prevent such accumulation, additional vibration can be coupled to the panels 172 by any suitable means such as placing one or more of the framework members 160 in contact with the base 152's powder recovery mechanism. Vibrations from the operation of the powder recovery mechanism are coupled via this contact to the framework members 160, and thus to the panels 172. This additional movement frequently is sufficient to knock adherent powder off the panels 172 and return it to the powder recovery mechanism 126.

In certain circumstances it is desirable to impart flame retardant capability to the panels 50, 64, 28, 100, 122, 130, 132, 172. In these circumstances, rigid poly(vinyl chloride) (PVC) and poly(vinylidene chloride) (PVDC or saran) can be used to enhance the flame retardance of the panels. The powder repellencies of panels made from these materials are equal to those of PE and PP. Test panels were constructed using 5 mil (about 0.13 mm) thick rigid PVC to form the panel cores and 0.4 mil (about 0.01 mm) thick PVDC (saran) sheet to cover the cores. Panels so constructed exhibited comparable powder shedding capabilities to those of the PC/PP walls described in the earlier examples. A number of other combinations were tested as described in the following examples. Results of those tests are illustrated in FIG. 16.

Examples VIII—Substitution of Materials

In these examples, the same test setup was used as was described previously, except that a white polyester appliance powder (Morton Corvell #20-1028) was substituted for the gray Glidden Pulvalure #159 previously used.

In the first of these examples, a core constructed from 5 mil (about 0.13 mm) thick PE was wrapped in a film of 0.4 mil (about 0.01 mm) thick saran. After 60 minutes of powder spraying followed by air blow-off, this test panel retained only about 0.27 g/ft$^2$ (about 2.9 g/m$^2$) of powder. This established the efficacy of saran as a wrapping to provide a booth inner surface 24.

Figure 17A:
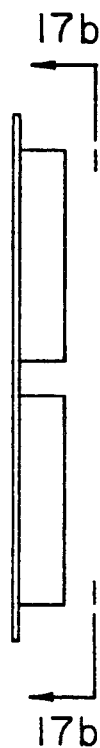
FIGS. 17a–c illustrate end elavational and front elevational views of an element of a thermoformed core, and of a vertical sectional end elevational view of a thermoformed core incorporated into a panel constructed according to the invention respectively.
Figure 17B:
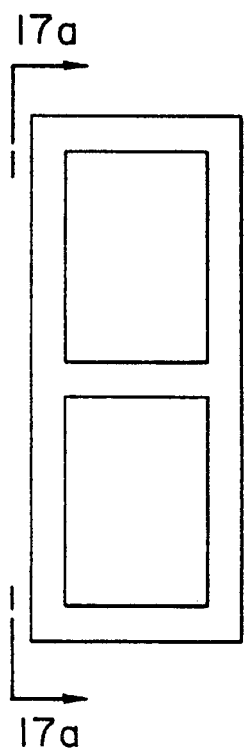
Figure 17C:
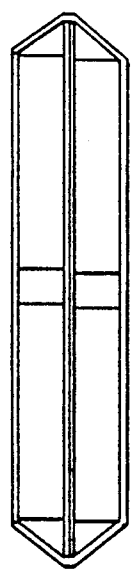

The next example was conducted using a thermoformed core of 7 mil (about 0.18 mm) thick PVC having the configuration illustrated in FIG. 17a. Two of these cores are placed back to back, in the configuration illustrated in FIG. 17b to provide a two inch (about 5 cm) thick test panel. This core was then wrapped with a 1.6 mil (about 0.04 mm) thick PP film. After 60 minutes of powder spraying followed by air blow-off, this test panel retained only about 0.21 g/ft$^2$ (2.3 g/m$^2$) of powder. This example established the utility of PVC as a core material. Thermoformable PVC provides the added benefit that the risk of deflation is reduced effectively to zero.

In the next example, rigid PVC was employed as the covering for a core of PE. A 5 mil (about 0.13 mm) inflatable core of PE was wrapped in a 5 mil (about 0.13 mm) film of rigid PVC. This panel was sprayed with powder for 60 minutes followed by air blow-off. The panel retained about 0.86 g/ft$^2$ (about 9.3 g/m$^2$) of powder. While this was higher than the retentions exhibited by the two immediately preceding examples, it is still satisfactory, and is a markedly better performance than a steel powder spray booth wall.

For the next example, inflatable saran tubing was obtained from Teepak, Inc., 3 Westbrook, Westchester, Ill., 60154. This tubing is constructed from 2 mil (about 0.05 mm) thick saran sheet which is overlapped and sealed to make a seamed tube. The tube was made up in lengths, inflated and sealed at the ends to retain its inflation. The diameters of the tubes were on the order of two inches (about 5 cm). The tubes laidside by side were then wrapped in a rigid PVC outer film having a thickness of 5 mils (about 0.13 mm). After spraying with powder for 60 minutes and a 15 second air blow-off, these test panels retained about 1.29 g/ft$^2$ (about 13.9 g/m$^2$) of powder. However, these panels cleaned almost completely when somewhat higher blowoff air pressures, typically encountered in industrial applications, were used in the air blow-off step.

In the next example, a test panel was constructed having an inflated core constructed from 5 mil (about 0.13 mm) thick PE wrapped in 5 mil (about 0.13 mm) thick flexible PVC film. This panel retained 2.85 g/ft$^2$ (about 30.7 g/m$^2$) of powder after only 5 minutes of spraying followed by the 15 second air blow-off. Raising the blowoff air pressure and extending the blowoff interval did not significantly reduce the amount of retained powder.

A four inch (about 10 cm) thick section of contoured, or so-called "egg crate", polyurethane (PU) foam was used as the test panel core in the next example. This core was wrapped in 1.6 mil (about 0.04 mm) thick PP film. This panel retained 5.23 g/ft$^2$ (about 56.3 g/m$^2$) of powder after only 5 minutes of spraying followed by the 15 second air blow-off. The retained powder was concentrated around the locations of contact between the core and wrap and feathered out away from these contacts. Increasing the blowoff air pressure did not significantly enhance powder recovery from this test panel.

In the next example expanded styrofoam packaging beads ("peanuts") were used to fill an outer pocket made from 1.6 mil (about 0.04 mm) thick PP film. The thickness of this particular test panel was about 3 inches (about 7.6 cm). This panel retained about 6.58 g/ft$^2$ (about 70.8 g/m$^2$) of powder after only 5 minutes of spraying followed by air blow-off. The retained powder seemed quite adherent to this test panel.

In the next example, one-half inch (about 1.3 cm) thick bubble packaging material constructed from a flame retardant PVC or PVDC and treated with an antistatic material was obtained. A core was formed from four layers of this bubble packaging material, providing a total thickness of about 2 inches (about 5 cm). This core was covered with a 1.6 mil (about 0.04 mm) film of PP. This test panel retained 21.58 g/ft$^2$ (about 232.3 g/m$^2$) of powder after only a 5 minutes powder spraying followed by the standard air blow-off. The substantial powder retention in this case was attributed to the presence of the antistat, but no untreated bubble packaging material of this particular construction could be obtained to test this hypothesis.

In the last of these material comparison examples, a nylon laminate having a thickness less than 5 mils (about 0.13 mm) was formed into the "air mattress" configuration with about a 2 inch (5 cm) thickness. This core was then covered with a 1.6 mil (about 0.4 mm) thick PP film. After 5 minutes of powder spraying followed by a 15 second air blowoff, this test panel retained a sufficiently large quantity of powder that the precise amount was not determined. The powder retention appeared heaviest along the lines of contact between the core and the outer wrap and feathered away from these lines of contact.

Other embodiments of the invention are illustrated fragmentarily in FIGS. 18a–b, 19a–b, 20a–b, 21a–b, 22a–b, 23, 24, 25, 26a–b, 27 and 28a–b.

Figure 18A:
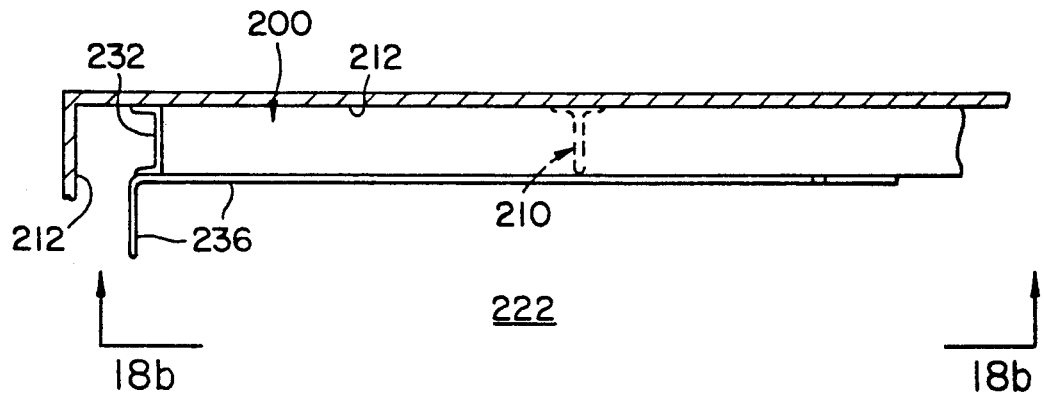
FIGS. 18a–b illustrate fragmentary plan and elevational view of a coating material application booth containing a liner constructed according to the present invention.
Figure 18B:
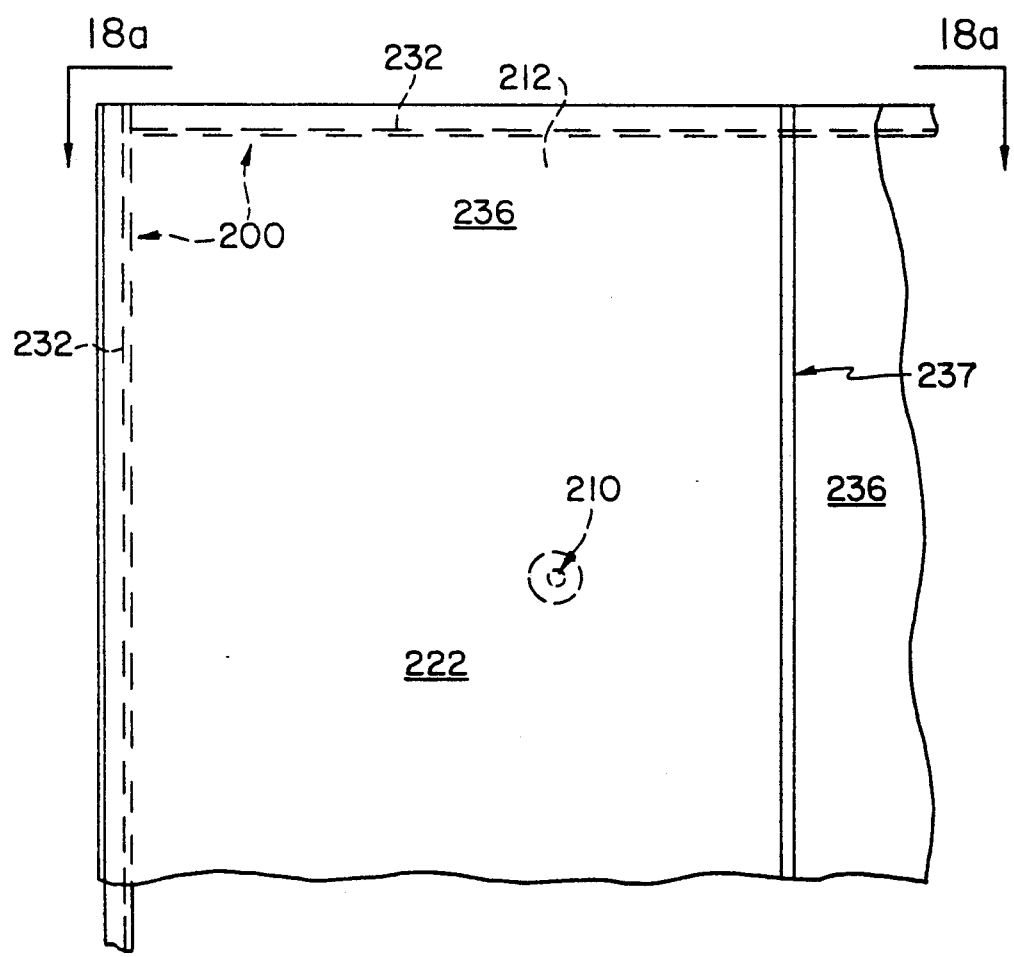

In the embodiments of each of FIGS. 18a–b through 22a–b, a supporting framework 200, 202, 204, 206, 208 and, where appropriate, additional spacers 210 (FIGS. 18a–b) is/are provided along the interior surface 212, 214, 216, 218, 220, respectively, of a metal-walled coating application booth 222, 224, 226, 228, 230, respectively. In the embodiment of FIGS. 18a–b, this supporting framework 200 is in the form of somewhat C-shaped channels 232 extending generally horizontally along the top and bottom edges and generally vertically at appropriate intervals along the length of the interior surface 212. Additional peg- or rod-like supports 210 can be provided at locations between channels 232 as required for support. The channels 232 and auxiliary supports 210 are constructed, for example, by molding, extrusion, or other appropriate manufacturing technique(s) from one of the materials previously demonstrated to have suitable powder shedding capability. The channels 232 and supports 210 are mounted to interior surface 212 by any of the means previously noted, including double sided tape, adhesives, synthetic hook-and-eyelet material, and the like. The channels 232 and supports 210, where they are present, serve as standoffs for the film 236 with which the booth 222 interior is then lined. Again, any of several previously mentioned techniques can be employed to fix the film 236 to the channels 232 and supports 210 where present. The seams 237 between adjacent strips of film 236 can be finished by taping, for example, with thin strips of tape made from the same material as the film with an adhesive backing. As two alternatives to taping, the film 236 itself can be formed with self adhesive edges or edges formed with Ziploc ™-type closure configurations which can be sealingly mated to each other when the film 236 is mounted.

Figure 19A:
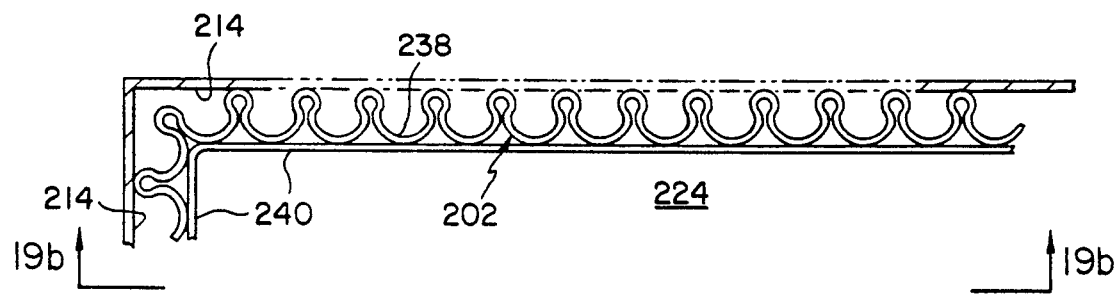
FIGS. 19a-b illustrate fragmentary plan and elevational views, respectively, of a coating material application booth containing a liner constructed according to the invention.
Figure 19B:
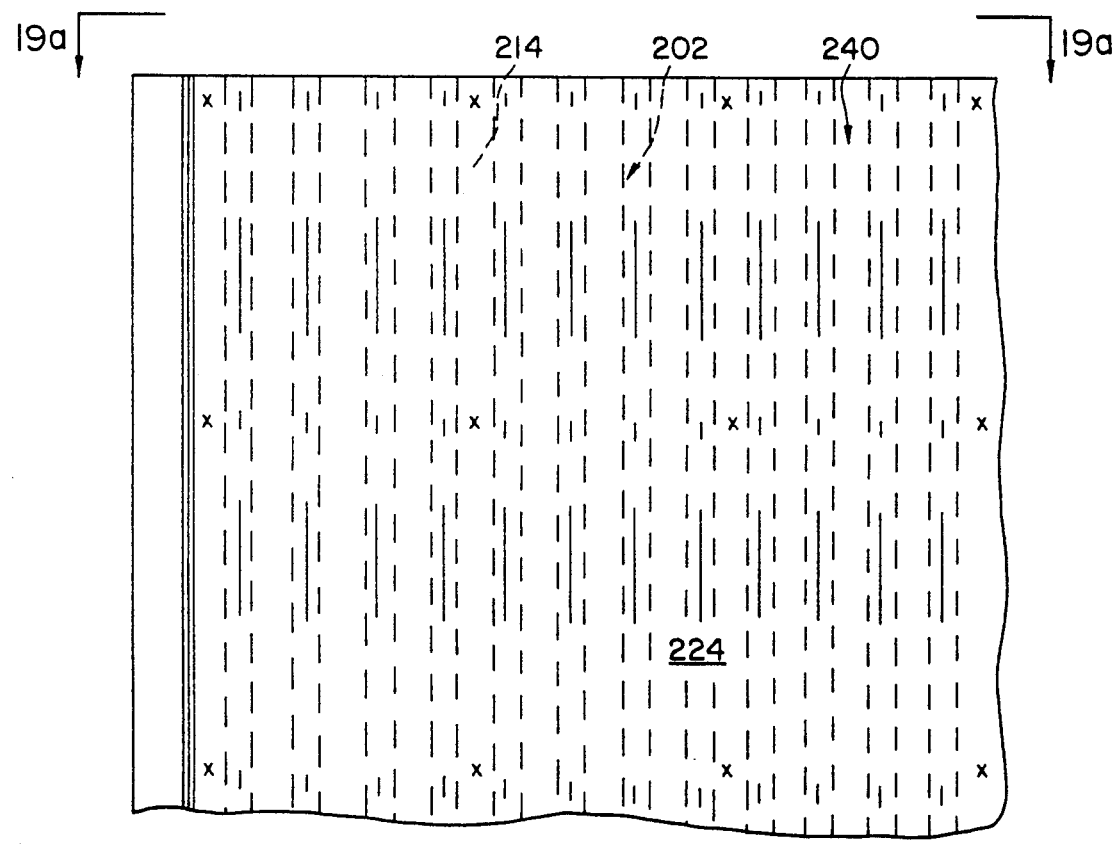

In the embodiment of FIGS. 19a-b, sheets 238 of material having a somewhat scalloped configuration as viewed in FIG. 19a with longitudinally extending ribs as viewed in FIG. 19b form the standoff framework 202. This framework 202 is attached by any of the previously discussed attachment means on one surface to the interior surface 214 of the booth 224, and on the other surface to the booth lining film 240. Again, the sheets 238 and film 240 are formed from materials previously demonstrated to have superior powder shedding capabilities when used alone or in combinations.

Figure 20A:
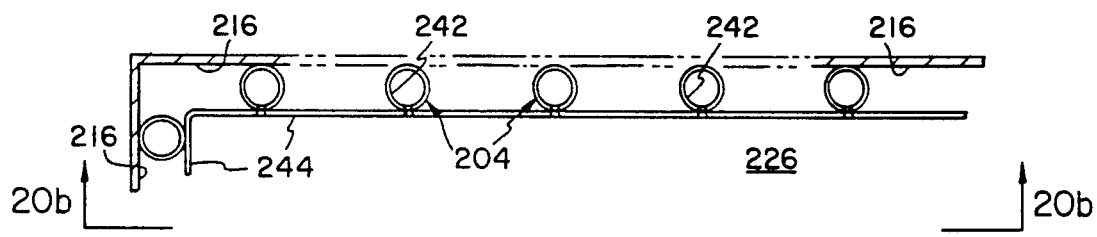
FIGS. 20a-b illustrate fragmentary plan and elevational views, respectively, of a coating material application booth containing a liner constructed according to the invention.
Figure 20B:
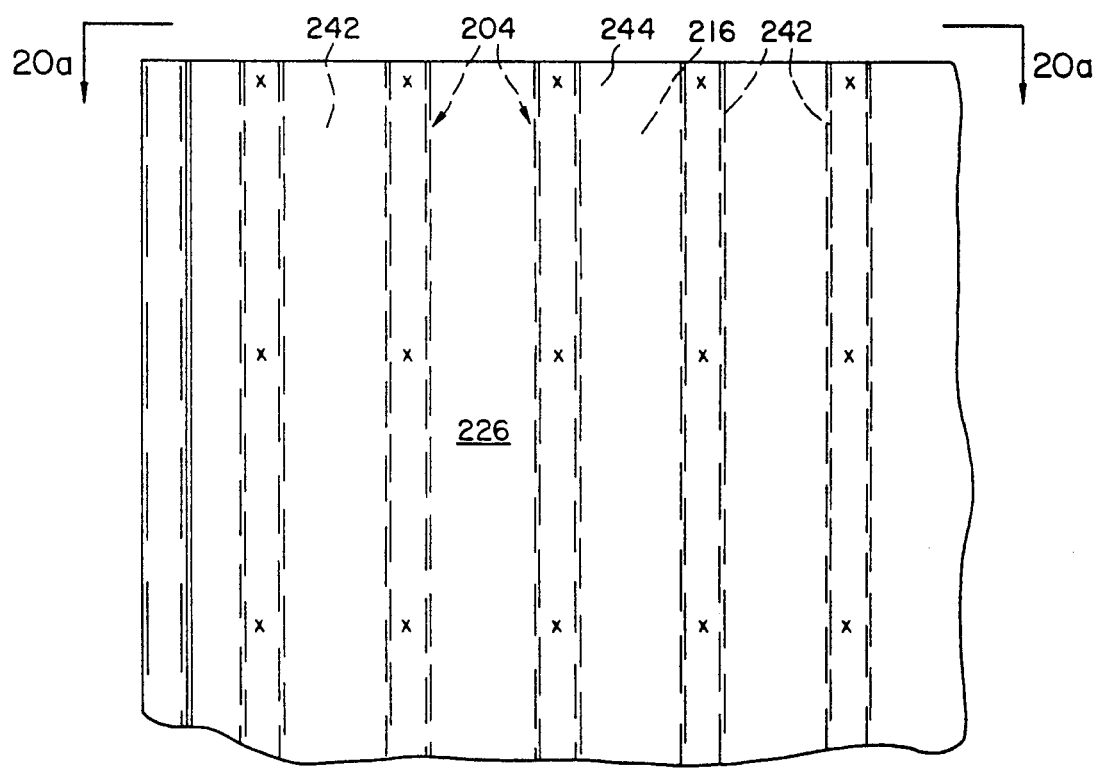

In the embodiment of FIGS. 20a-b, circular cross section tubes 242 are attached at appropriate intervals to the interior surface 216 of the booth 226 by any of several previously discussed appropriate means. The same, or other appropriate, means are then employed to fix the booth liner film 244 to some or all of the tubes 242. Again, tubes 242 and film 244 are formed from materials previously demonstrated to have superior powder shedding capabilities.

Figure 21A:
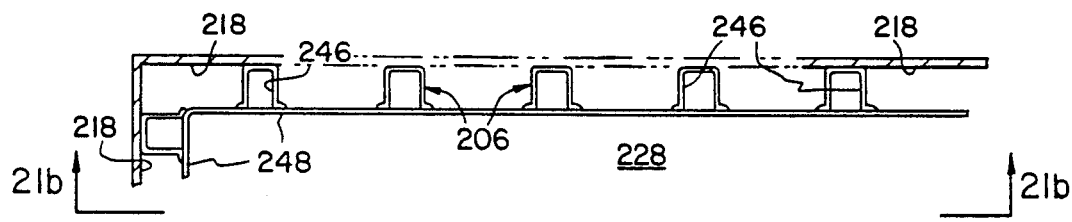
FIGS. 21a-b illustrate fragmentary plan and elevational views, respectively, of a coating material application booth containing a liner constructed according to the invention.
Figure 21B:
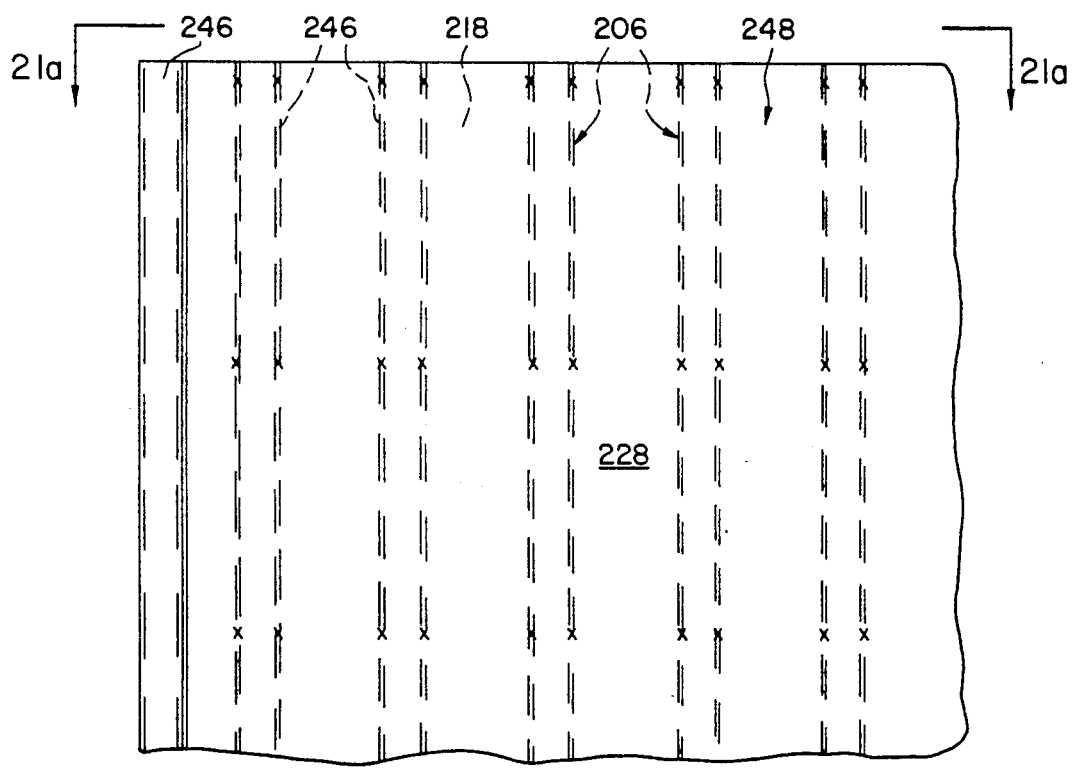

In the embodiment of FIGS. 21a-b, somewhat C-shaped transverse section channel 246 is used. This channel 246 is somewhat deeper than that illustrated in FIGS. 18a-b. The channels 246 are attached at the free ends of their parallel sidewalls by any of the means previously described to the film 248 which lines the booth 228. The webs of channels 246 are attached by any of the means previously described to the interior surfaces 218 of booth 228. Channels 246 and film 248 are formed from any of the previously identified materials which exhibit superior powder shedding capability.

In the embodiment of FIGS. 22a-b, somewhat V-shaped transverse section channel 250 is used. The standoff framework 208 constructed from channel 250 comprises channel lengths extending generally parallel to each other. The channels 250 are attached at the free ends of their sidewalls by any of the means previously described to the film 252 which lines the booth 230. The vertices of the channels 250 are attached by any of the means previously described to the interior surfaces 220 of booth 230. Channels 250 and film 252 are formed from any of the previously identified materials which exhibit superior powder shedding capabilities.

Figure 23:
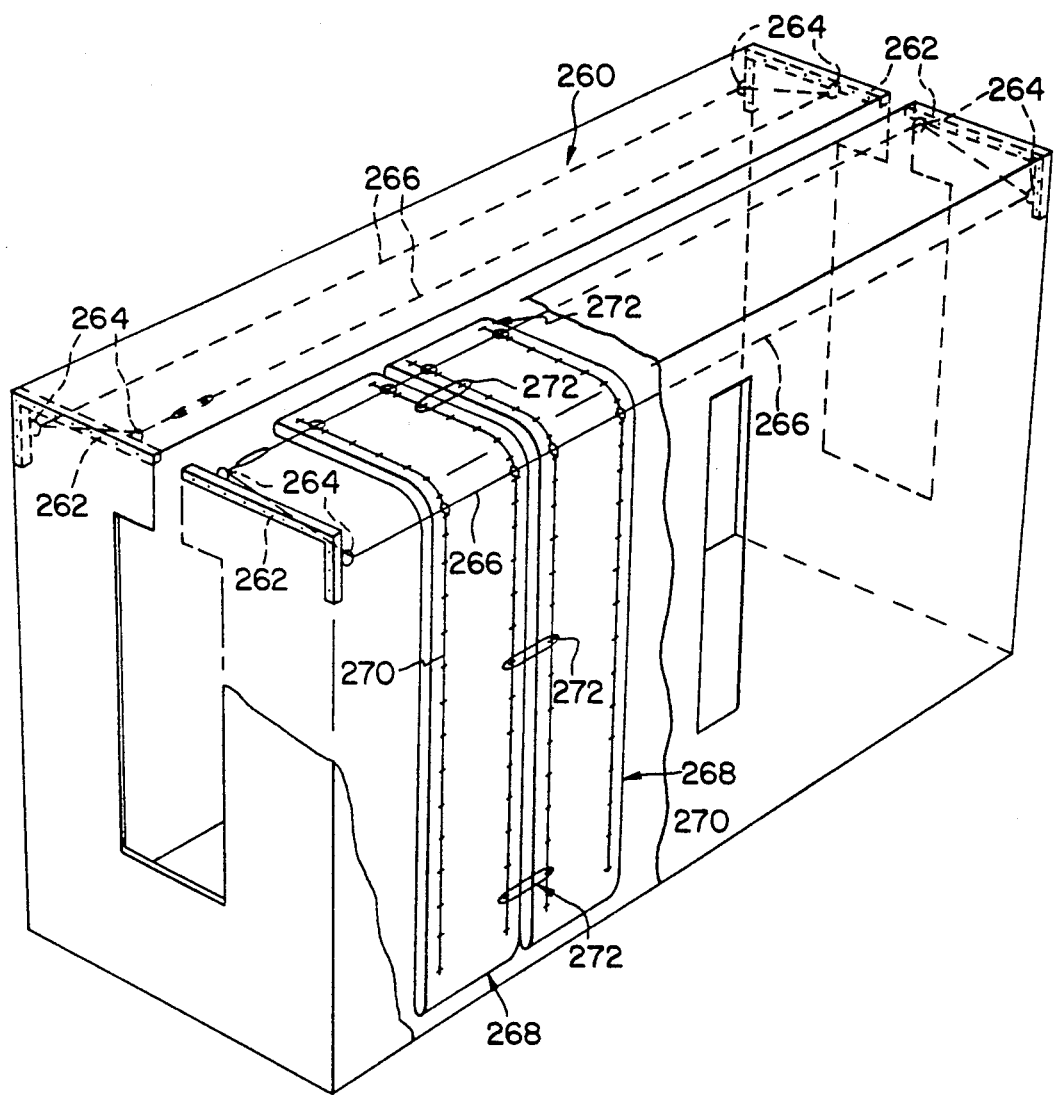
FIG. 23 illustrates a fragmentary perspective view of a coating material application booth containing a liner constructed according to the invention.

In FIG. 23, the upper corners of a conventional metal-walled booth 260 are fitted with L-shaped corner brackets 262. Each corner bracket 262 is provided with a pair of eyelets 264 for receiving a wire 266 which is threaded therethrough. The ends of wire 266 are joined by a turnbuckle which permits the wire 266 to be tensioned. Panels 268 constructed according to any of several of the previously described techniques are provided with glued, taped or otherwise fixed strips 270 on one side thereof to facilitate hanging them. The panels 268 are suspended from the longitudinal runs of wire 266, for example, by threading wire bundle tie-wraps 272 through strips 270 and around the longitudinal runs of wire 266. The panels 268 can be tie-wrapped together by the same technique to keep them from separating and/or their adjacent longitudinal edges can be sealed with tape made from, for example, the same film with which the panels 268 are covered, provided with an adhesive on one of its surfaces.

Figure 24:
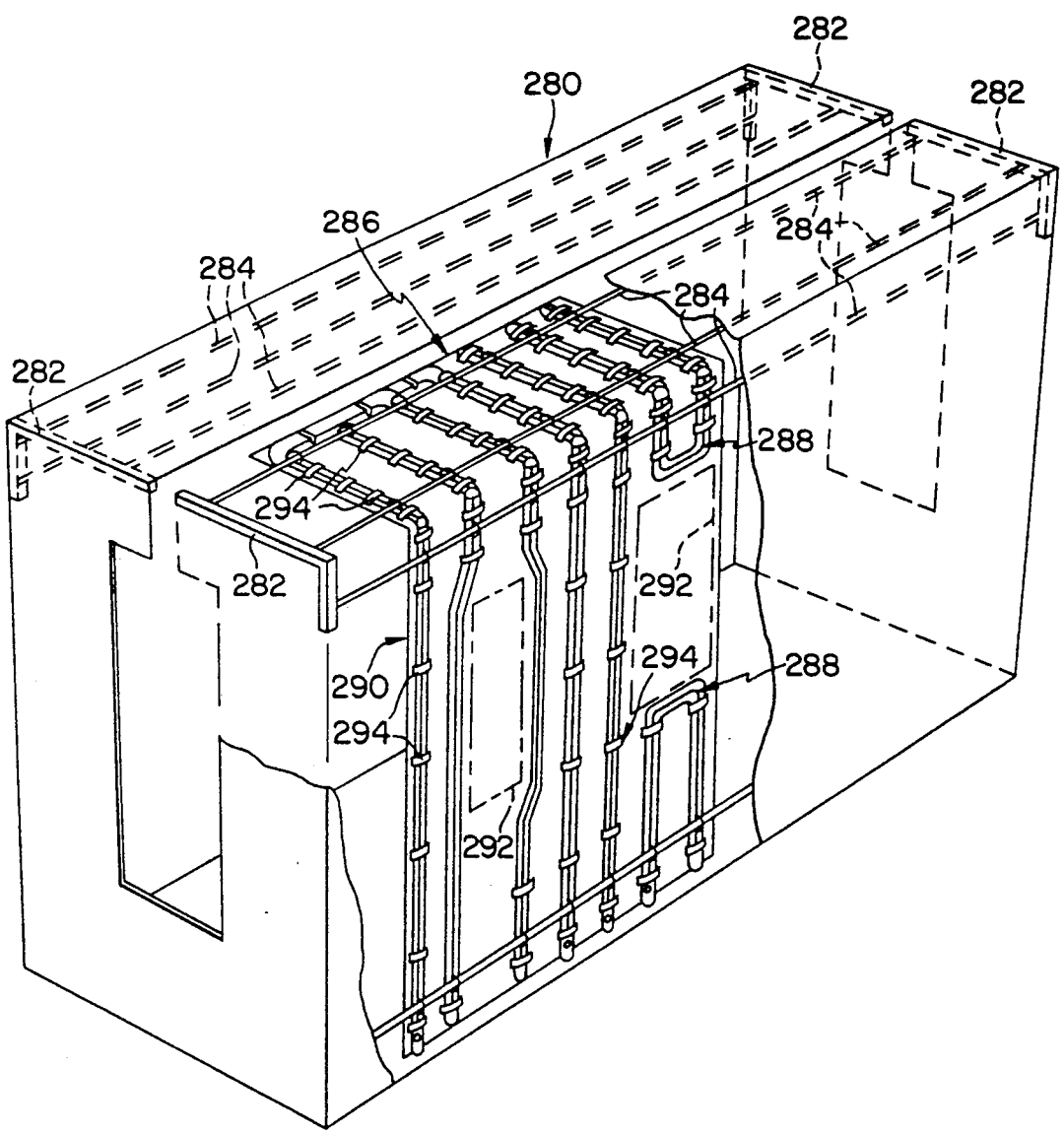
FIG. 24 illustrates a fragmentary perspective view of a coating material application booth containing a liner constructed according to the invention.

In FIG. 24, the corners of a conventional metal-walled booth 280 are fitted with L-shaped corner brackets 282 between longitudinally spaced pairs of which extend rigid support rods 284. The panels 286 in this embodiment are constructed from the previously mentioned 2 inch (about 5 cm) inflatable saran tubing 288. The tubing 288 is attached to the film 290 at spaced locations along its length by tethers 294 such as film tape or synthetic hook-and-eyelet material loops provided on the film 290 to secure the tubing 288 to the film 290. The tubing 288 is repositioned by bending it around openings 292 such as those provided through the walls of booth 280 to accommodate, for example, powder dispensing guns. The panels 286 are detachably mounted to the rods 284 and attached to each other when they are mounted in the booth 280 by, for example, tie wraps.

Figure 25:
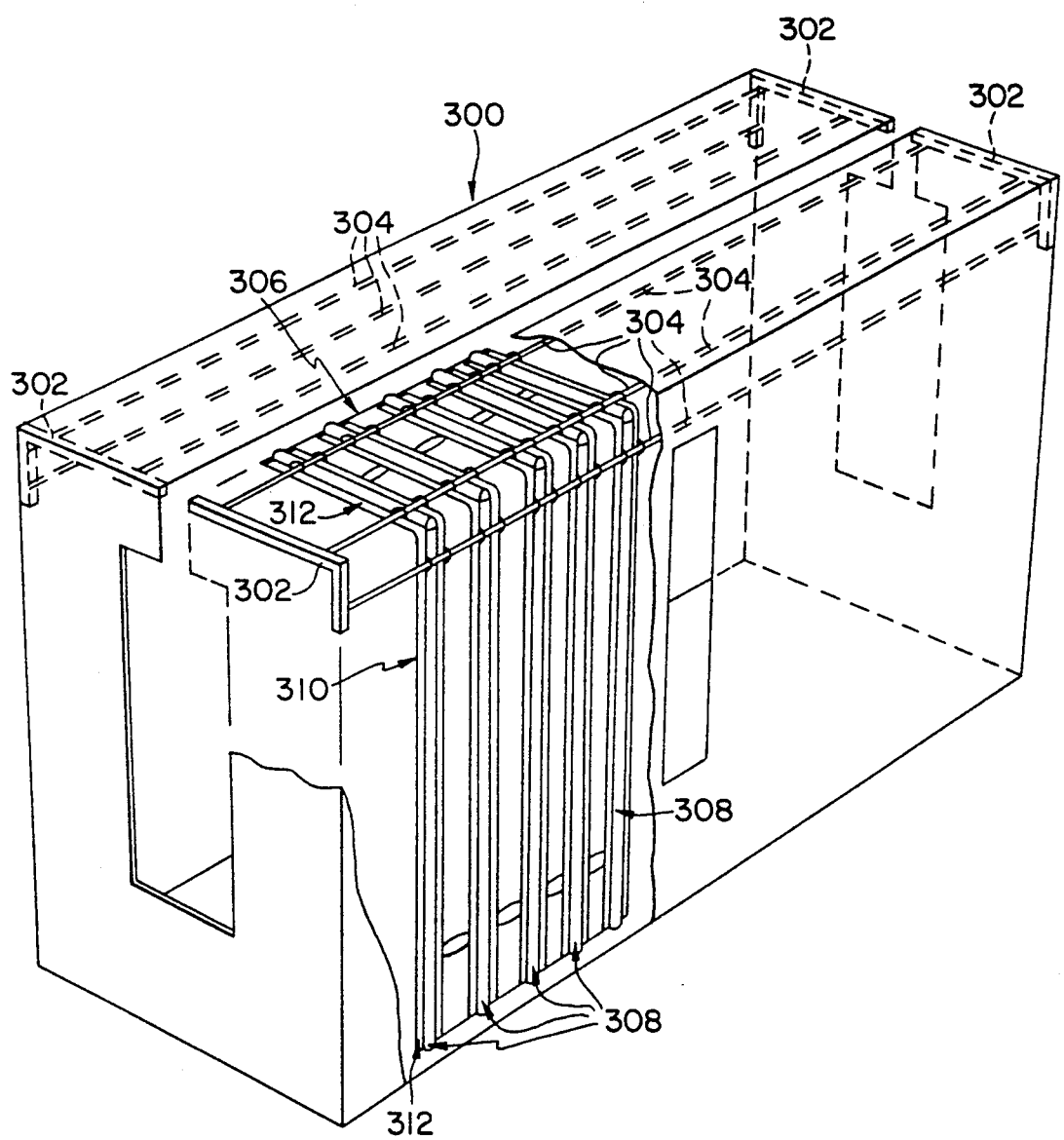
FIG. 25 illustrates a fragmentary perspective view of a coating material application booth containing a liner constructed according to the invention.

In FIG. 25, the upper corners of a conventional metal-walled booth 300 are fitted with L-shaped corner brackets 302 between longitudinally spaced pairs of which extend rigid support rods 304. The panels 306 in this embodiment are constructed from the 2 inch (about 5 cm) saran tubing 308 which is attached by appropriate adhesive at selected sites across the width of a film curtain 310 which forms the interior exposed surface of the booth 300. The lengths of tubing 308 are provided with tabs containing grommets 312 longitudinally along their lengths. Tie-wraps or other suitable fastening means can be threaded through these grommets to help secure the tubes 308 together and to attach the panels 306 to the rods 304.

Figure 26A:
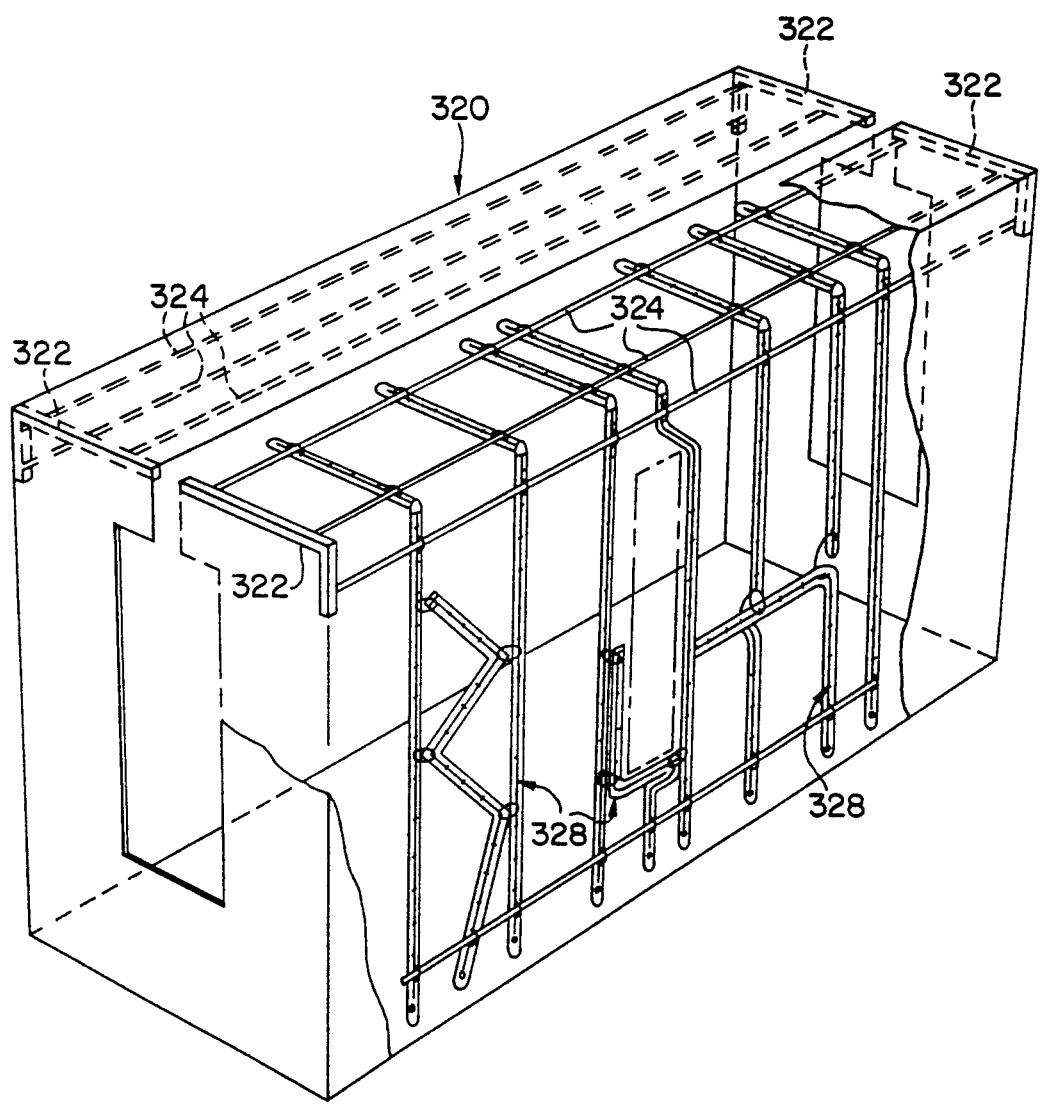
FIG. 26a-b illustrate fragmentary perspective views of a coating material application booth containing a liner constructed according to the invention.
Figure 26B:
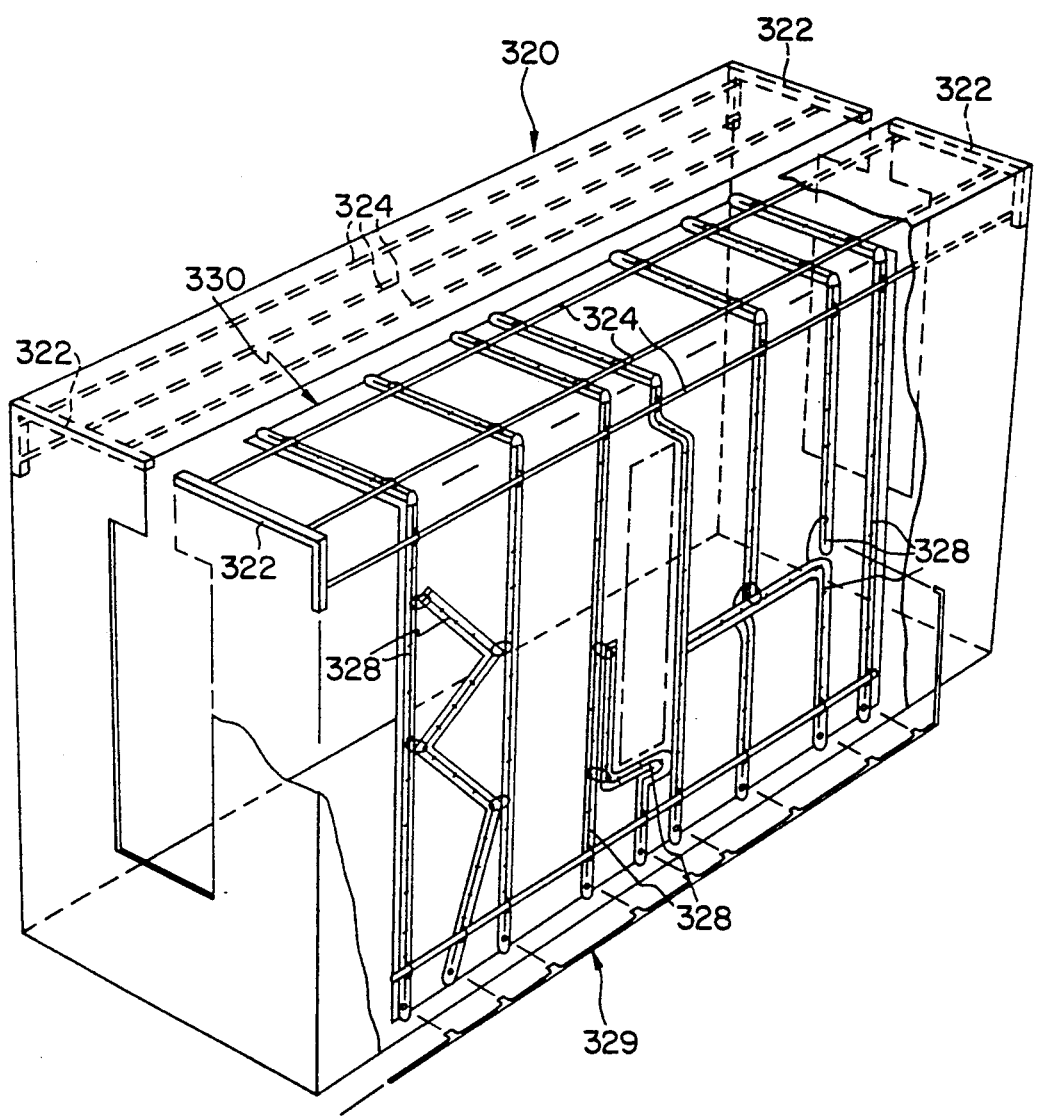

In FIG. 26a, the upper corners of a conventional metal-walled booth 320 are fitted with L-shaped corner brackets 322 between longitudinally spaced pairs of which extend rigid support rods 324. A matrix of 2 inch (about 5 cm) saran tubes 328 is supported from rods 324 and assembled using tie-wraps or other appropriate fastening means. Appropriate contact adhesives or synthetic hook-and-eyelet material fasteners provided on the inward (toward the booth 320 interior) facing surfaces of tubes 328 and on the outside surfaces of a film 330 curtain (FIG. 26b) are then used to hang the film 330 curtain from the tube 328 matrix. Tubes 328 are pneumatically linked 329 to each other and to a source of inflation (not illustrated) to inflate, and to maintain uniform inflation of, all of tubes 328.

Figure 27:
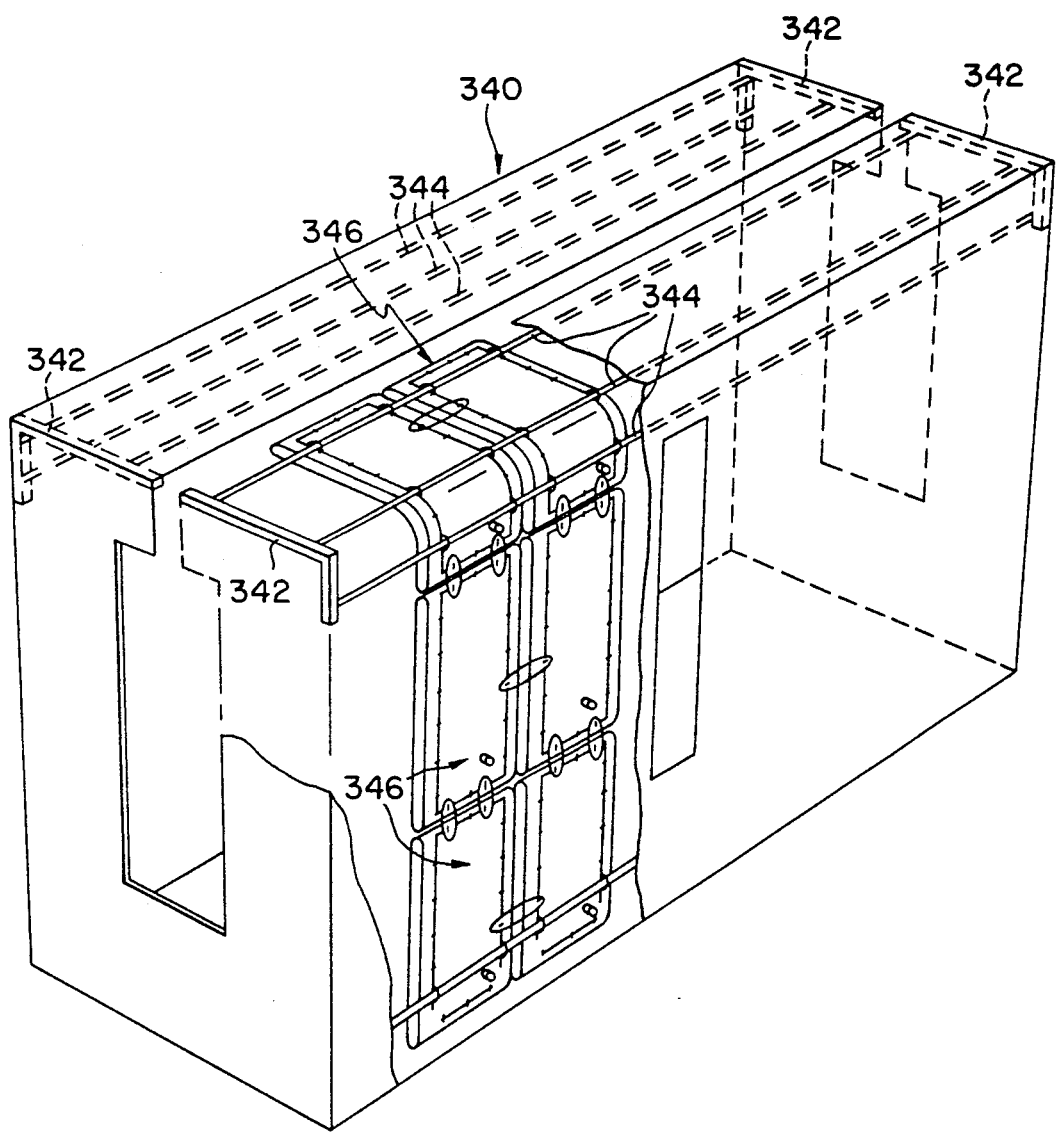
FIG. 27 illustrates a fragmentary perspective view of a coating material application booth containing a liner constructed according to the invention.

In FIG. 27, the upper corners of a conventional metal-walled booth 340 are fitted with L-shaped corner brackets 342 between longitudinally spaced pairs of which extend rigid support rods 344. The panels 346 in this embodiment are like the panels 268 (FIG. 23) except that they are only about one-third the length of panels 268. Three panels 346 are joined end to end using tie-wraps or other suitable fastening means to form a vertical strip of the covering for booth 340. Adjacent vertical strips are formed in the same way and the joints between panels 346 are covered, for example, by taping. The panels 346 are removably secured to rods 344 by, for example tie-wraps or synthetic hook-and-eyelet material.

Figure 28A:
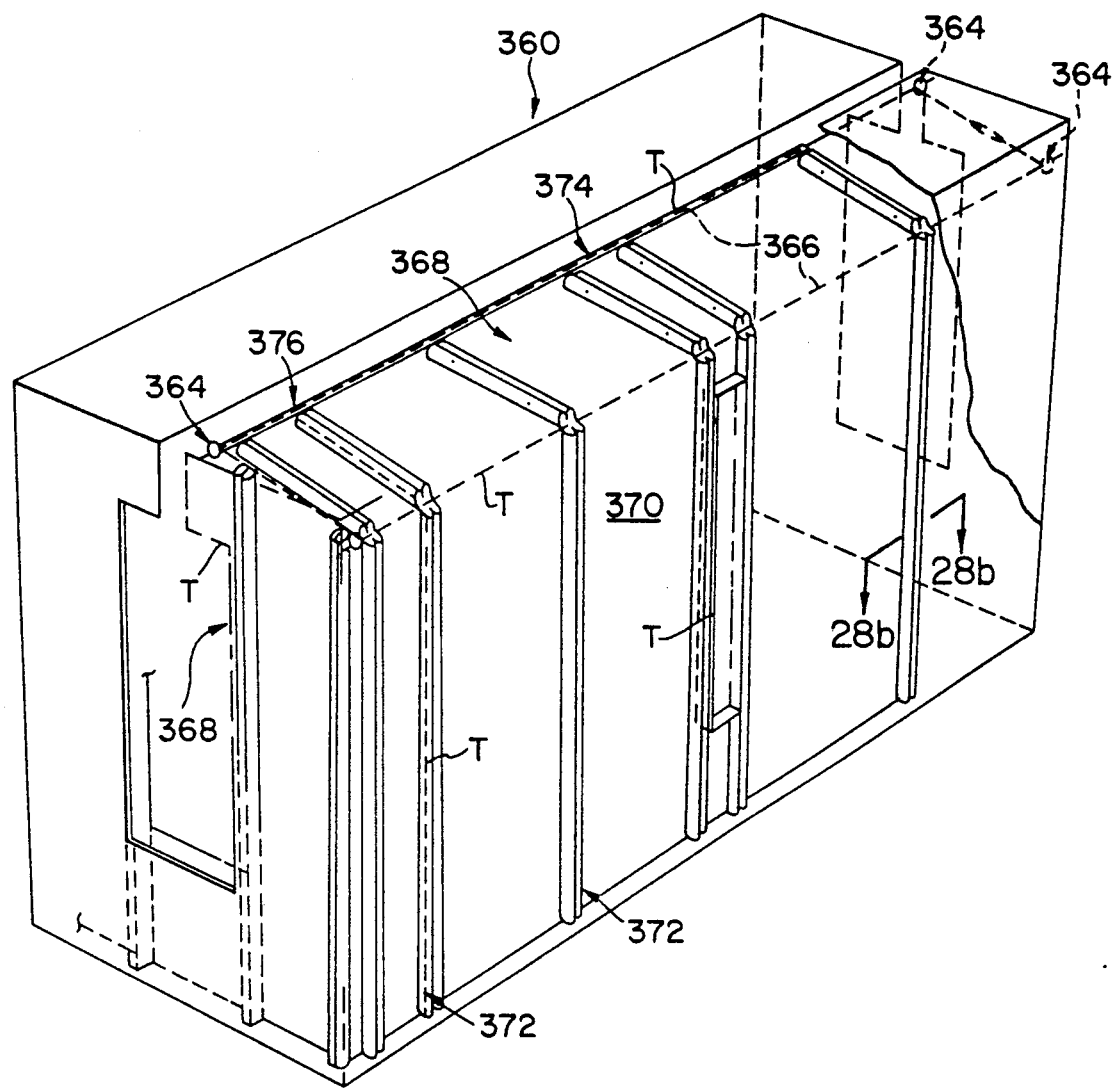
FIGS. 28a-b respectively illustrate a fragmentary perspective view of a coating material application booth containing a liner constructed according to the invention, and a fragmentary sectional view of a detail of FIG. 28a, taken generally along section lines 28b-28b thereof.
Figure 28B:
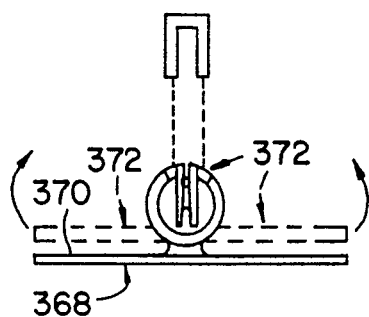

In FIG. 28a, the upper corner of a conventional metal-walled booth 360 is provided with a pair of eyelets 364. The panels 368 in this embodiment are generally flat sheets on the back sides 370 of which are formed, or to the back sides 370 of which are applied, flat, roll-up standoffs 372 (FIG. 28b). Panels 368 can be shipped flat. Prior to installation in booth 360, however, standoffs 372 are rolled from their orientations illustrated in broken lines in FIG. 28b to their orientations illustrated in solid lines in FIGS. 28a–b and fixed in these rolled orientations, for example, by clips constructed from any of the materials disclosed herein having superior powder shedding characteristics. The top edge 374 of each panel 368 is provided with a fold and means such as snaps or synthetic hook-and-eyelet material to maintain the folded orientation of the top edge 374. The panels 368 are stood up in the booth 360 and the wire 366 is then threaded through the eyelets 364. The top edge 374 is folded over the uppermost run (adjacent the conveyor slot 376) of the wire 366 and fastened around wire 366 to fix the panels 368 in the booth 360. The turnbuckle is then tightened to the appropriate tension of wire 366.

What is claimed is:

1. A powder coating booth comprising a pair of inflatable, non-polyamide, non-polyurethane polymer walls defining between them a booth inner space, a booth entry end and a booth exit end, and a mechanism for recovery of powder which does not adhere to articles conveyed through the booth inner space, the powder recovery mechanism lying between the walls, the non-polyamide, non-polyurethane polymer walls comprising means defining one or more inflatable cells, means for inflating the cells, and a film for covering the means defining one or more cells.

2. The apparatus of claim 1 and further comprising means for supporting the inflatable walls in spaced orientation to define between them the booth inner space.

3. The apparatus of claim 2 wherein the means for supporting the inflatable walls in spaced orientation comprises a framework of supports and means for attaching the walls to the supports.

4. The apparatus of claim 3 wherein the means for attaching the walls to the supports comprises rings provided on the walls for placement around respective supports of the framework.

5. The apparatus of claim 3 wherein the means for attaching the walls to the supports comprises adhesive for attaching the walls to the supports of the framework.

6. The apparatus of claim 2 wherein the means for supporting the inflatable walls in spaced orientation comprises a somewhat rectangular prism-shaped walled structure, and means for mounting the inflatable walls to inside walls of the structure.

7. The apparatus of claim 6 wherein the means for mounting the inflatable walls to inside walls of the structure comprises synthetic hook and eyelet material, the hook material being mounted on one of the inflatable wall and structure and the eyelet material being mounted on the other of the inflatable wall and structure.

8. The apparatus of claim 1 wherein the means defining one or more cells and the means for inflating the cells together comprises a layer of bubble packaging material.

9. The apparatus of claim 1 or 7 wherein the film for covering the means defining one or more cells comprises a sheet of non-polyamide, non-polyurethane polymer film forming an envelope for the means defining one or more cells.

10. The apparatus of claim 1 wherein the non-polyamide, non-polyurethane polymer walls comprise thermoformed cores and a non-polyamide, non-polyurethane polymer film envelope enveloping each core and closed to provide suitable inflation of each wall.

11. The apparatus of claim 10 wherein each core comprises a web region in which are formed a plurality of cup-shaped structures.

12. A powder coating booth construction method comprising the steps of providing a pair of inflatable, non-polyamide, non-polyurethane polymer walls, supporting the walls in spaced apart orientation to define between them a booth inner space, a booth entry end and a booth exit end, and providing between the walls a mechanism for recovery of powder which does not adhere to articles conveyed through the booth inner space, the step of providing non-polyamide, non-polyurethane polymer walls comprising providing walls defining one or more inflatable cells covered by a film, and inflating the cells.

13. The method of claim 12 wherein the step of supporting the inflatable walls in spaced orientation comprises providing a framework of supports and attaching the walls to the supports.

14. The method of claim 13 wherein the step of attaching the walls to the supports comprises providing rings on the walls for placement around respective supports of the framework.

15. The method of claim 13 wherein the step of attaching the walls to the supports comprises applying adhesive between the walls and supports of the framework.

16. The method of claim 12 wherein the steps of providing one or more cells and inflating the cells together comprise the step of providing a layer of bubble packaging material.

17. The method of claim 16 wherein the step of providing cells covered by a film comprises the step of providing cells covered by a sheet of non-polyamide, non-polyurethane polymer film forming an envelope for the one or more cells.

18. The method of claim 12 wherein the step of supporting the inflatable walls in spaced orientation comprises providing a somewhat rectangular prism-shaped walled structure, and mounting the inflatable walls to inside walls of the structure.

19. The method of claim 18 wherein the step of mounting the inflatable walls to inside walls of the structure comprises providing synthetic hook and eyelet material, mounting the hook material on one of the inflatable wall and structure and mounting the eyelet material on the other of the inflatable wall and structure.

20. The method of claim 12 wherein the step of providing non-polyamide, non-polyurethane polymer walls comprises the steps of providing thermoformed cores and a non-polyamide, non-polyurethane polymer film envelope and closing a respective envelope around each core to provide suitable inflation of each wall.

21. The method of claim 20 wherein the step of providing thermoformed cores comprises the step of providing a web region in which are formed a plurality of cup-shaped structures.

* * * * *